United States Patent
Li et al.

(10) Patent No.: US 12,145,068 B2
(45) Date of Patent: *Nov. 19, 2024

(54) MAP GENERATION METHOD AND APPARATUS, ELECTRONIC DEVICE, AND COMPUTER STORAGE MEDIUM

(71) Applicant: Tencent Technology (Shenzhen) Company Limited, Shenzhen (CN)

(72) Inventors: Jianquan Li, Shenzhen (CN); Zaixing Cheng, Shenzhen (CN); Gang Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/521,999

(22) Filed: Nov. 28, 2023

(65) Prior Publication Data
US 2024/0091647 A1    Mar. 21, 2024

Related U.S. Application Data

(63) Continuation of application No. 17/508,746, filed on Oct. 22, 2021, now Pat. No. 11,865,452, which is a (Continued)

(30) Foreign Application Priority Data

Jan. 2, 2020 (CN) .......................... 202010003410.7

(51) Int. Cl.
*A63F 13/60* (2014.01)
*G06T 11/60* (2006.01)

(52) U.S. Cl.
CPC .............. *A63F 13/60* (2014.09); *G06T 11/60* (2013.01); *A63F 2300/6009* (2013.01)

(58) Field of Classification Search
CPC .............. A63F 13/60; A63F 2300/6009; A63F 13/5378; G06T 11/60
(Continued)

(56) References Cited

U.S. PATENT DOCUMENTS 7,575,518 B2    8/2009    Tabata
9,336,618 B1    5/2016    Fontaine
(Continued)

FOREIGN PATENT DOCUMENTS

CN    107050860 A    8/2017
CN    108057245 A    5/2018
(Continued)

OTHER PUBLICATIONS

Gao Dayong, "Random Map Generation of Dead Cells", Indienova Indie Game, Jul. 1, 2018, 15 pgs., Retrieved from the Internet: https://zhuanlan.zhihu.com/p/38775608.
(Continued)

*Primary Examiner* — Pierre E Elisca
(74) *Attorney, Agent, or Firm* — Morgan, Lewis & Bockius LLP

(57) ABSTRACT

This application discloses a map generation method performed by an electronic device. The method includes: randomly placing first M sub-level maps of N sub-level maps in a predetermined map region, N>M, and the first M sub-level maps not overlapping with each other and at least one of the first M sub-level maps is not connected to the others of the first M sub-level maps; selecting, among the remaining N−M sub-level maps, one or more to-be-placed sub-level maps; and iteratively placing the to-be-placed sub-level maps at target candidate regions adjacent the at least one of the first M sub-level maps in accordance with a predetermined condition to obtain a target map, wherein the predetermined condition comprises: after a to-be-placed
(Continued)

sub-level map is placed at one of the target candidate regions, the sub-level map is connected to the at least one of the first M sub-level maps.

18 Claims, 11 Drawing Sheets

Related U.S. Application Data continuation of application No. PCT/CN2020/124881, filed on Oct. 29, 2020.

(58) Field of Classification Search
  USPC .......................................................... 463/31
  See application file for complete search history.

(56) References Cited

U.S. PATENT DOCUMENTS

| | | | |
|---|---|---|---|
| 11,865,452 B2 | 1/2024 | Li et al. | |
| 2004/0224759 A1 | 11/2004 | Nishimura | |
| 2007/0206023 A1 | 9/2007 | Street et al. | |
| 2012/0268468 A1 | 10/2012 | Elenzil | |
| 2013/0045800 A1 | 2/2013 | Yang | |
| 2013/0279806 A1* | 10/2013 | Tonisson | G06F 16/56 |
| | | | 382/173 |
| 2017/0243084 A1* | 8/2017 | Soatto | G06F 18/24 |
| 2017/0252641 A1 | 9/2017 | Morimura et al. | |
| 2020/0008387 A1* | 1/2020 | Lin | A01H 6/4636 |
| 2020/0033857 A1* | 1/2020 | Yu | H04W 4/38 |
| 2020/0138319 A1* | 5/2020 | Spector | A61B 5/287 |
| 2020/0154095 A1* | 5/2020 | Fleischman | G06V 20/64 |
| 2022/0040583 A1* | 2/2022 | Li | A63F 13/60 |
| 2022/0154095 A1* | 5/2022 | Kim | C10M 107/32 |

FOREIGN PATENT DOCUMENTS

| | | |
|---|---|---|
| CN | 108108410 A | 6/2018 |
| CN | 109675313 A | 4/2019 |
| CN | 110478900 A | 11/2019 |
| CN | 111185009 A | 5/2020 |
| JP | 2004329697 A | 11/2004 |
| JP | 2008136693 A | 6/2008 |
| JP | 2013059546 A | 4/2013 |
| JP | 2015083121 A | 4/2015 |
| KR | 101868286 B1 | 6/2018 |
| RU | 2687714 C2 | 5/2019 |

OTHER PUBLICATIONS

Tencent Technology, Australian Office Action, AU Patent Application No. 2020416878, Aug. 26, 2022, 3 pgs.
Tencent Technology, Canadian Office Action, CA Patent Application No. 3,135,525, Nov. 23, 2022, 5 pgs.
Tencent Technology, Canadian Office Action, CA Patent Application No. 3,135,525, Sep. 20, 2023, 5 pgs.
Tencent Technology, Extended European Search Report, EP20908586.9, May 19, 2022, 6 pgs.
Tencent Technology, Indian Office Action, IN Patent Application No. 202147049151, Aug. 16, 2022, 6 pgs.
Tencent Technology, ISRWO, PCT/CN2020/124881, Jan. 27, 2021, 6 pgs.
Tencent Technology, IPRP, PCT/CN2020/124881, Jul. 5, 2022, 5 pgs.
Tencent Technology, Korean Office Action, KR Patent Application No. 10-2021-7034393, Sep. 12, 2023, 25 pgs.
Tencent Technology, Singaporean Office Action, SG Patent Application No. 11202111634U, Mar. 7, 2023, 7 pgs.
Tencent Technology, Vietnamese Office Action, VN Patent Application No. 1-2021-06848, Jun. 25, 2024, 4 pgs.

* cited by examiner

MAP GENERATION METHOD AND APPARATUS, ELECTRONIC DEVICE, AND COMPUTER STORAGE MEDIUM

CROSS-REFERENCE TO RELATED APPLICATIONS

This application is a continuation application of U.S. patent application Ser. No. 17/508,746, entitled "MAP GENERATION METHOD AND APPARATUS, ELECTRONIC DEVICE, AND COMPUTER STORAGE MEDIUM" filed on Oct. 22, 2021, which is a continuation application of PCT Patent Application No. PCT/CN2020/124881, entitled "MAP GENERATION METHOD AND APPARATUS, ELECTRONIC DEVICE, AND COMPUTER STORAGE MEDIUM" filed on Oct. 29, 2020, which claims priority to Chinese Patent Application No. 202010003410.7, filed with the State Intellectual Property Office of the People's Republic of China on Jan. 2, 2020, and entitled "MAP GENERATION METHOD AND APPARATUS, ELECTRONIC DEVICE, AND COMPUTER STORAGE MEDIUM", all of which are incorporated herein by reference in their entirety.

FIELD OF THE TECHNOLOGY

This application relates to the field of maps, and in particular, to a map generation method and apparatus, an electronic device, and a computer storage medium.

BACKGROUND OF THE DISCLOSURE

With an increasing number of types of games, a simulated scenario is introduced in a game so as to better attract users. A map appears in the scenario. The map may make it easy for a player to clearly know the player's current location in the game. Map generation in the game is a complex task.

In order to improve experience of the game, the map in the game generally has different game maps at different levels, thereby preventing impossible novelty caused by repetitive maps. That is, each level is provided with a random map. In a related art, a map with closed borders is formed based on a random level mechanism. However, a level randomizing scheme with closed borders has a poor effect on a scale and complexity of the map. As a result, it is less flexible to generate a large-scale and high-complexity random map.

SUMMARY

Embodiments of this application provide a map generation method and apparatus, an electronic device, and a computer storage medium, which can improve flexibility in generation of a large-scale random map.

The technical solutions in the embodiments of this application are implemented as follows.

The embodiments of this application provide a map generation method performed by an electronic device, the method including:

selecting N sub-level maps from a sub-level map library, N being a natural number greater than 1; sequentially placing first M sub-level maps of the N sub-level maps in a predetermined map region, N>M, the first M sub-level maps being all located in the map region, and the first M sub-level maps not overlapping with each other; and sequentially placing to-be-placed sub-level maps, which meet a predetermined condition, of N−M sub-level maps in the map region to obtain a target map, the N−M sub-level maps being sub-level maps of the N sub-level maps other than the first M sub-level maps, and the predetermined condition including: when the to-be-placed sub-level maps are located in a target candidate region of the map region, the to-be-placed sub-level maps not overlapping with the sub-level maps placed in the map region and being connected to at least one of the sub-level maps placed in the map region.

The embodiments of this application provide an electronic device, including:

a memory, configured to store executable instructions; and a processor, configured to perform the map generation method according to the embodiments of this application when executing the executable instructions stored in the memory.

The embodiments of this application provide a non-transitory computer storage medium, storing executable instructions, the executable instructions being configured to perform the map generation method according to the embodiments of this application at runtime.

The embodiments of this application have the following beneficial effects:

In the embodiments of this application, N sub-level maps are selected from a sub-level map library, where N is a natural number greater than 1; first M sub-level maps of the N sub-level maps are sequentially placed in a predetermined map region, N>M, the first M sub-level maps being all located in the map region, and the first M sub-level maps not overlapping with each other; and to-be-placed sub-level maps, which meet a predetermined condition, of N−M sub-level maps are sequentially placed in the map region to obtain a target map, the N−M sub-level maps being sub-level maps of the N sub-level maps other than the first M sub-level maps, and the predetermined condition including: when the to-be-placed sub-level maps are located in a target candidate region of the map region, the to-be-placed sub-level maps not overlapping with the sub-level maps placed in the map region and being connected to at least one of the sub-level maps placed in the map region; which achieves a purpose that a basic random unit is a sub-level map on the basis of sub-level splicing, so as to achieve a technical effect of generating a random big map according to a random sub-level map, thereby solving the technical problem of poor flexibility in generation of a large-scale random map in the related art. That is, the flexibility in generation the large-scale random map is improved.

DESCRIPTION OF EMBODIMENTS

Figure 1:
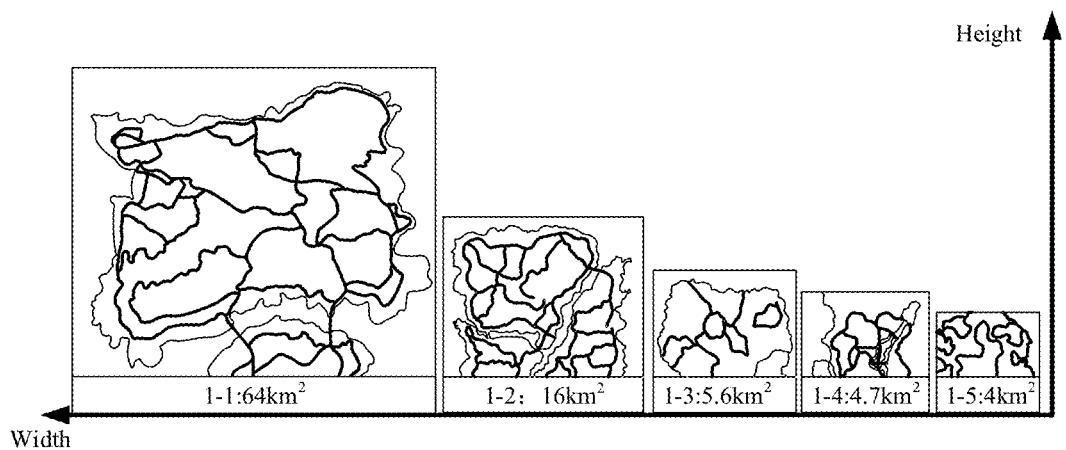
FIG. 1 is a schematic diagram of orders of sizes for different big world scenarios.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following descriptions, the term "some embodiments" describes subsets of all possible embodiments, but it may be understood that "some embodiments" may be the same subset or different subsets of all the possible embodiments, and can be combined with each other without conflict.

Unless otherwise defined, meanings of all technical and scientific terms used in this specification are the same as that usually understood by a person skilled in the art to which this application belongs. Terms used in this specification are merely intended to describe objectives of the embodiments of this application, but are not intended to limit this application.

In this specification, the claims, and the accompanying drawings of this application, the terms "first", "second", and so on are intended to distinguish similar objects but do not necessarily indicate a specific order or sequence. It is to be understood that the data termed in such a way are interchangeable in appropriate circumstances, so that the embodiments of this application described herein can be implemented in orders other than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

Unless otherwise defined, meanings of all technical and scientific terms used in this specification are the same as that usually understood by a person skilled in the art to which this application belongs. Terms used in this specification are merely intended to describe objectives of the embodiments of this application, but are not intended to limit this application.

Before the embodiments of this application are further described in detail, a description is made on terms in the embodiments of this application, and the terms in the embodiments of this application are applicable to the following explanations.

1) Big world: A conventional shooting game is generally played in a scenario within a 200 m*200 m range (the distance metric here is calculated relative to a height of a player character model, and a game character generally has a height between 1.7 m and 2.0 m). A big world scenario is introduced into lots of shooting games starting with a PC game Player Unknown's Battlegrounds (PUBG). A size scale of a game map has been significantly expanded to the order of 8 km*8 km.

Exemplarily, FIG. 1 is a schematic diagram of orders of sizes for different big world scenarios. As shown in FIG. 1, widths of the big world scenarios sequentially increase from right to left, and heights of the big world scenarios sequentially increase from bottom to top. A width and a height of Map 1-1 are both 8 km*8 km; therefore, Map 1-1 is on the order of 64 $km^2$ in size. A width and A height of Map 1-2 are both 4 km*4 km; therefore, Map 1-2 is on the order of 16 $km^2$ in size. Map 1-1 and Map 1-2 are larger-sized big world scenarios. In some cases, a big world map may also be of a small size, for example, Map 1-3 on the order of 5.6 $km^2$ in size, Map 1-4 on the order of 4.7 $km^2$ in size and Map 1-5 on the order of 4 $km^2$ in size.

2) Circle shrinkage: It is a classic gameplay mechanism accompanying the creation of the big world map. As the game progresses, a number of circles with gradually decreasing radii may be generated in a game scenario, and player characters outside the circles may be continuously damaged. In order to win the game, a player has to always stay inside the circles. The big world map combined with circle shrinkage can well gradually aggregate players from a wide world into a small range, which not only ensures diversified scenario experience, but also ensures that a game confrontation between the players can have an end and an outcome is determined.

Figure 2:
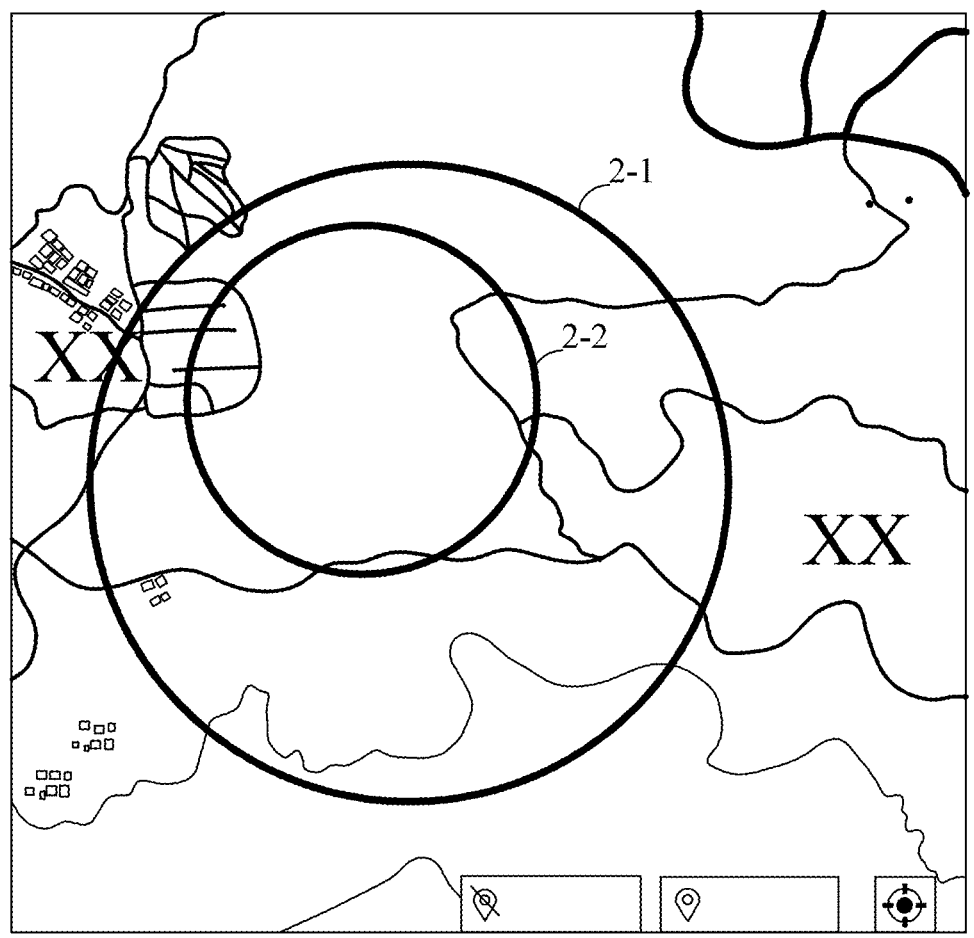
FIG. 2 is an example diagram of a process of circle shrinkage.

Exemplarily, FIG. 2 is a schematic diagram of a process of circle shrinkage. Referring to FIG. 2, after a game starts, a player character may move anywhere on the map without damage. After a period of play, a circle region 2-1 may be generated in the game scenario. In this case, player characters outside the circle region 2-1 may be continuously damaged. After another period of play, the circle region 2-1 may shrink to a circle region 2-2. In this case, player characters outside the circle region 2-2 may be continuously damaged. The process of generating the circle region 2-1 and reducing the circle region 2-1 to the circle region 2-2 is a process of circle shrinkage.

3) 3D game: D in 3D is short for Dimension. A game is called a 3D game if a base model of a game (characters, scenarios and base terrain of the game) is implemented using a 3D model, and positions of game characters are depicted using three-dimensional coordinates (x, y, z).

4) Sub-level: A sub-level is a concept in an Unreal4 engine ($4^{th}$ generation virtual engine). The game has only one entry level. The entry level is generally a resident level that exists throughout the game and is called a main level. If other levels are dynamically loaded or unloaded through the main level, such dynamic levels may be considered as sub-levels subordinate to the main level. Scenario sizes of the sub-levels are not limited, and the sub-levels may also have game logic or gameplay. The main level and the sub-levels are only in a structural subordination relationship instead of an inclusion relationship.

5) Connectivity: Connectivity in this application is essentially a distance-based concept. When a distance between two sub-levels meets a certain condition, which is generally less than or equal to a certain threshold, the two sub-levels are considered to be connected.

In order to improve experience of the game, each level is provided with a random map. The random map is random arrangement of a series of small map blocks (no more than 100 m*100 m) on a two-dimensional plane, and random lots have obvious splicing traces. Game elements within the map blocks are also relatively fixed, with no double-layer structures in buildings or terrain. Essentially, it is a 2.5D scenario which limits 3D representation. The game scenario is a three-dimensional surface, and each pair of (x, y) values may correspond to a unique z value.

Figure 3:
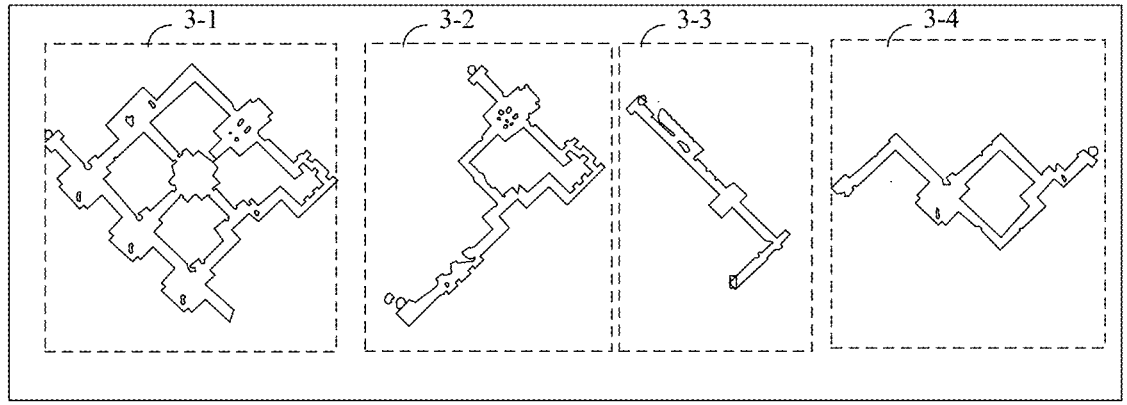
FIG. 3 is a schematic diagram of a random level scheme with closed borders.

Referring to FIG. 3, FIG. 3 is a schematic diagram of a random level scheme with closed borders. It may be seen from FIG. 3 that Map 3-1, Map 3-2, Map 3-3 and Map 3-4 are all obtained by random splicing of some fixed small maps. As can be seen, in the related art, the random level mechanism used in large quantities, at its core, is to splice a plurality of smaller map blocks into an internally connected level, which is a level randomizing scheme with closed borders. Obviously, a scale map and a complex three-dimensional space map cannot be met in this manner. That is, it is not flexible enough to generate a large-scale and high-complexity random map.

To sum up, a person skilled in the art does not analyze a map generation method, and the above technology is not common knowledge for a person skilled in the art. Therefore, it is difficult for a person skilled in the art to find and raise the above problem. However, the map generation method is analyzed in detail in the embodiments of this application, and the above technical problem is found.

The embodiments of this application provide a map generation method and apparatus, an electronic device, and a computer storage medium, which can improve flexibility in generation of a large-scale random map. The map generation method according to this application is performed by the electronic device. In some embodiments of this application, the map generation method may be implemented separately by the electronic device. For example, some implementation steps are implemented at a terminal device and others are implemented at a server. A large-scale random map is generated through interaction between the server and the terminal device. In some other embodiments of this application, the map generation method is implemented as a whole by the electronic device. For example, all the implementation steps are implemented at the terminal, or all the steps are implemented through the server.

Figure 4:
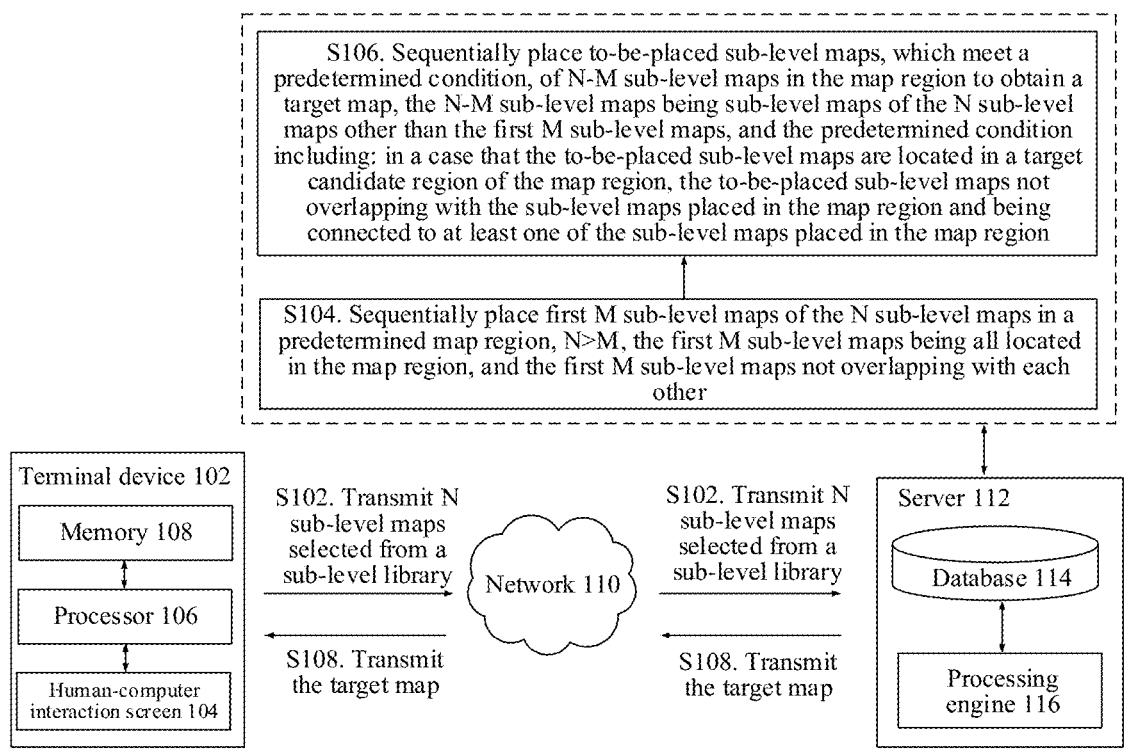
FIG. 4 is a schematic diagram of an application environment of a map generation method according to an embodiment of this application.

In this application, as an implementation, the map generation method may be applied to, but is not limited to, a map generation system in a hardware environment shown in FIG. 4. The map generation system may include, but is not limited to, a terminal device 102, a network 110 and a server 112.

The terminal device 102 may include, but is not limited to, a human-computer interaction screen 104, a processor 106 and a memory 108. The human-computer interaction screen 104 is configured to acquire a human-computer interaction instruction through a human-computer interaction interface, and further configured to render a screen of a random map in a game. The processor 106 is configured to place a random sub-level map in a corresponding big map in response to the human-computer interaction instruction. The memory 108 is configured to store a sub-level map library, a random map of sub-levels and a target map. The server here may include, but is not limited to, a database 114 and a processing engine 116. The processing engine 116 is configured to call N sub-level maps from the sub-level map library stored in the database 114, sequentially place first M sub-level maps of the N sub-level maps in a predetermined map region, and sequentially place to-be-placed sub-level maps of N–M sub-level maps in the map region to obtain a target map, the to-be-placed sub-level maps not overlapping with the sub-level maps placed in the map region and being connected to at least one of the sub-level maps placed in the map region. The target map is then flexibly generated based on a sub-level map as a random unit.

A specific process involves the following steps: An interaction interface of a game client running a round of a game task is displayed on the human-computer interaction screen 104 in the terminal device 102. In steps S102 to S108, the N sub-level maps selected from the sub-level map library are acquired, and the N sub-level maps are transmitted to the server 112 through the network 110. The server 112 sequentially places first M sub-level maps of the N sub-level maps in a predetermined map region, N>M, the first M sub-level maps being all located in the map region, and the first M sub-level maps not overlapping with each other; and sequentially places to-be-placed sub-level maps, which meet a predetermined condition, of N–M sub-level maps in the map region to obtain a target map, the N–M sub-level maps being sub-level maps of the N sub-level maps other than the first M sub-level maps, and the predetermined condition including: when the to-be-placed sub-level maps are located in a target candidate region of the map region, the to-be-placed sub-level maps not overlapping with the sub-level maps placed in the map region and being connected to at least one of the sub-level maps placed in the map region. The result determined above is then returned to the terminal device 102; that is, the target map is transmitted.

Then, in steps S102 to S108, the terminal device 102 selects the N sub-level maps from the sub-level map library, sequentially places the first M sub-level maps of the N sub-level maps in the predetermined map region without overlapping with each other, and sequentially places the to-be-placed sub-level maps of N–M sub-level maps in the map region to obtain the target map, the to-be-placed sub-level maps not overlapping with the sub-level maps placed in the map region and being connected to at least one of the sub-level maps placed in the map region. The target map is then flexibly generated based on a sub-level map as a random unit.

In some embodiments of this application, the map generation method may be applied to, but is not limited to, the server 112, for placing the random map of sub-levels in a region meeting a preset condition, to obtain the target map. The terminal device 102 may be, but is not limited to, a terminal device supporting running of an application client, such as a smartphone, a tablet computer, a notebook computer and a PC. The server 112 may be an independent physical server, may be a server cluster formed by a plurality of physical servers or a distributed system, or may be a cloud server providing cloud computing services. The server 112 and the terminal device 102 may be, but is not limited to, realize data exchange through a network. The network may include, but is not limited to, a wireless network and a wired network. The wireless network includes: Bluetooth, Wi-Fi, and another network implementing wireless communication. The wired network may include, but not limited to: a wide area network, a metropolitan area network, and a local area network. The foregoing description is merely an example, which is not limited in this embodiment.

Figure 5:
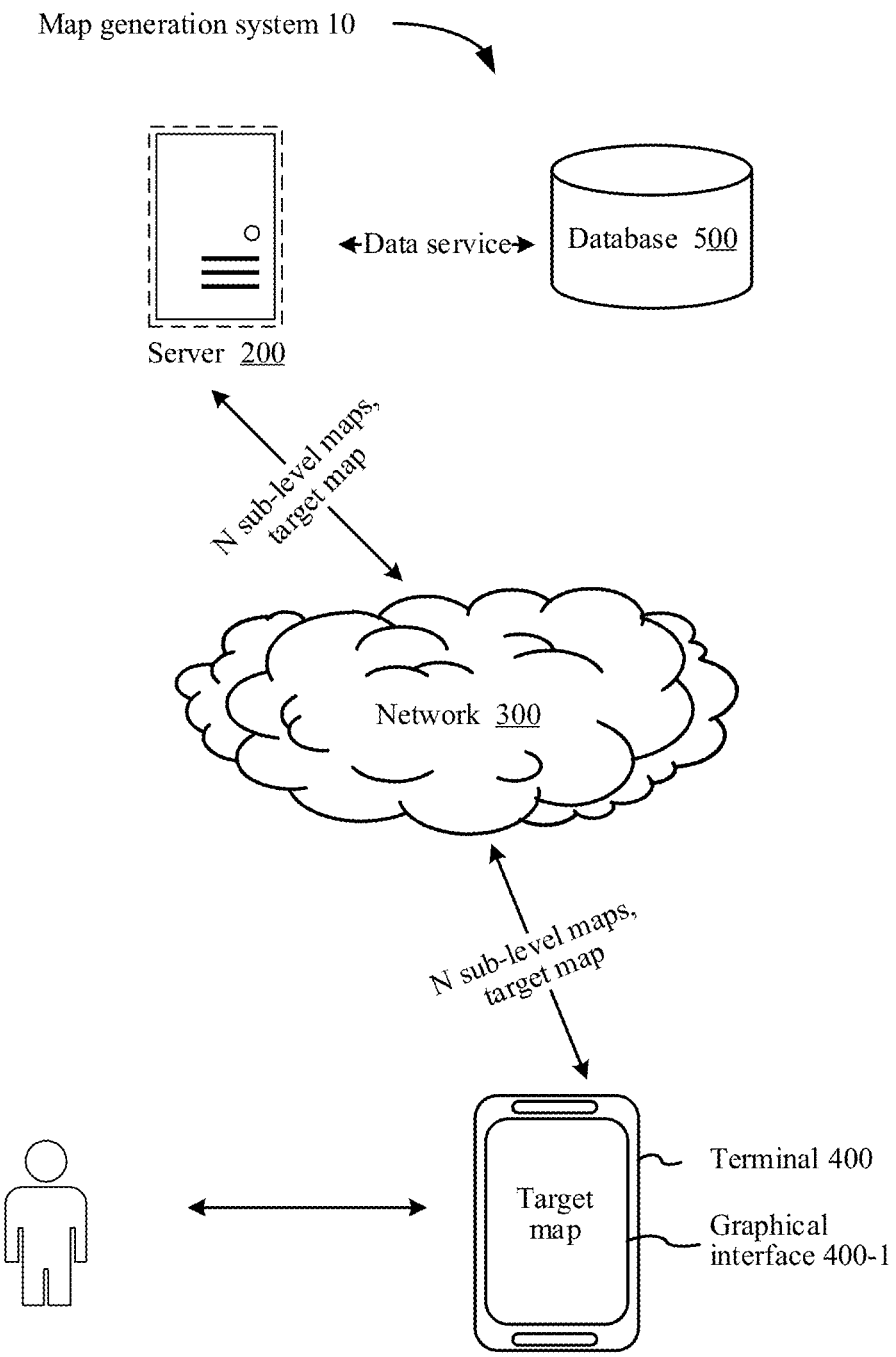
FIG. 5 is a schematic diagram of an application scenario of a map generation system 10 according to an embodiment of this application.

In an example, referring to FIG. 5, FIG. 5 is a schematic diagram of an application scenario of a map generation system 10 according to an embodiment of this application. A terminal 400 is connected to a server 200 through a network 300. The network 300 may be a wide area network, a local area network, or a combination thereof. The server 200 is further provided with a database 500. The database 500 is configured to provide a data service for the server 200.

The terminal 400 may be configured to transmit selected N sub-level maps. For example, when a user starts a game, the terminal 400 may selects N sub-level maps from a sub-map library, and transmit the N sub-level maps to the server 200 through the network 300. N is a natural number greater than 1.

The server 200 sequentially places first M sub-level maps of the N sub-level maps in a predetermined map region, N>M, the first M sub-level maps being all located in the map region, and the first M sub-level maps not overlapping with each other. Then, the server 200 sequentially places to-be-placed sub-level maps, which meet a predetermined condition, of N–M sub-level maps in the map region to obtain a target map, N–M sub-level maps being sub-level maps of the N sub-level maps other than the first M sub-level maps, and the predetermined condition including: when the to-be-placed sub-level maps are located in a target candidate region of the map region, the to-be-placed sub-level maps not overlapping with the sub-level maps placed in the map region and being connected to at least one of the sub-level maps placed in the map region. The server 200, after generating the target map, may transmit the target map to the terminal 400 through the network 300. The terminal 400 renders, on an image interface 400-1, a screen of the target map generated by the server 200 to the user.

Figure 6:
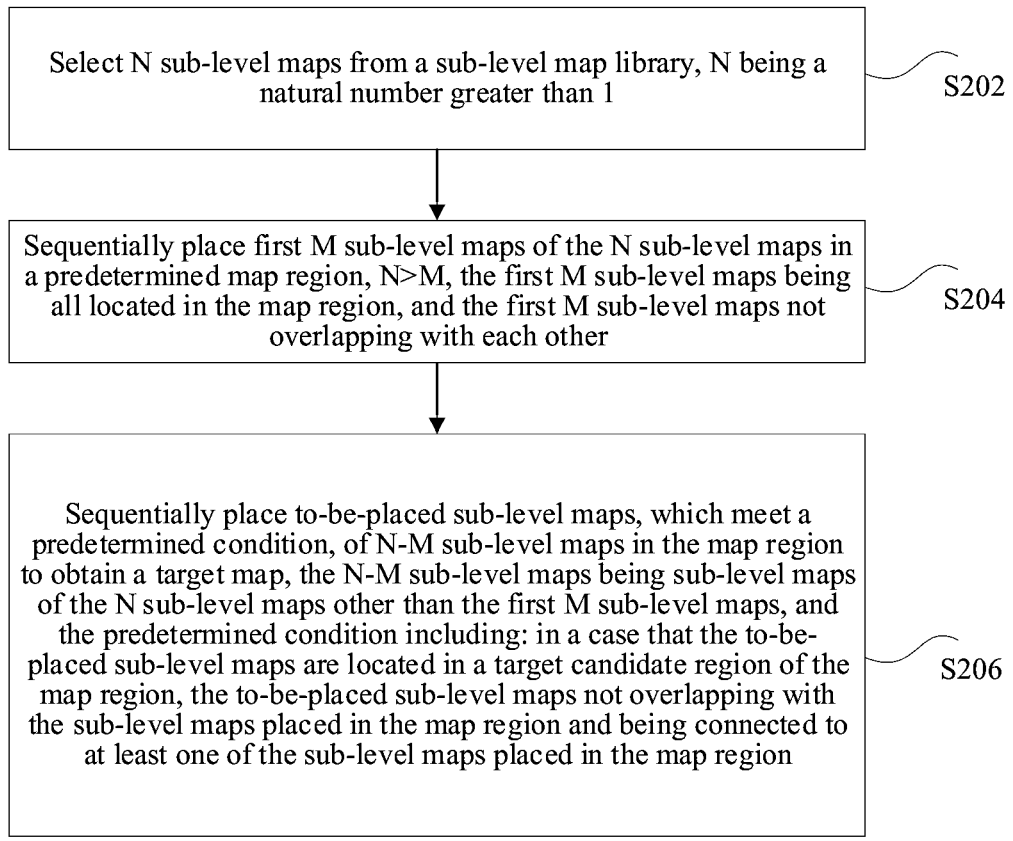
FIG. 6 is a flowchart of a map generation method according to an embodiment of this application.

In some embodiments of this application, as an implementation, as shown in FIG. 6, the map generation method according to an embodiment of this application includes the following steps:

Step S202. Select N sub-level maps from a sub-level map library, N being a natural number greater than 1.

Step S204. Sequentially place first M sub-level maps of the N sub-level maps in a predetermined map region, N>M, the first M sub-level maps being all located in the map region, and the first M sub-level maps not overlapping with each other.

Step S206. Sequentially place to-be-placed sub-level maps, which meet a predetermined condition, of N–M sub-level maps in the map region to obtain a target map, the N–M sub-level maps being sub-level maps of the N sub-level maps other than the first M sub-level maps, and the predetermined condition including: when the to-be-placed sub-level maps are located in a target candidate region of the map region, the to-be-placed sub-level maps not overlapping with the sub-level maps placed in the map region and being connected to at least one of the sub-level maps placed in the map region.

In this application, the implementation solution may be applied to, but is not limited to, random generation of big maps in shooting games, which may also be applied to, for example, generation of replica maps in role-playing games. Terrain and buildings are randomly generated in a big world game scenario. The randomly generated terrain includes, but is not limited to, islands and mainland.

It is to be understood that the electronic device may randomly select the N sub-level maps from the sub-level map library or select the N sub-level maps based on an order of sub-level maps.

Figure 7:
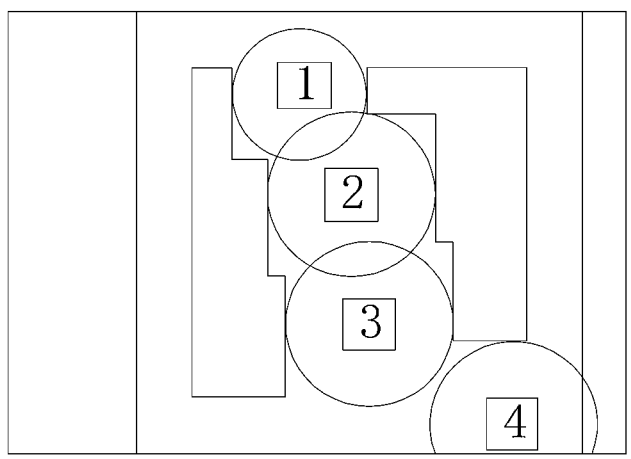
FIG. 7 is a schematic diagram of a random island level map according to an embodiment of this application.

Exemplarily, by taking islands as an example, a plurality of island maps are placed in a map region. The electronic device may select 8 sub-level maps from the sub-map library, and randomly select 4 maps from the 8 sub-level maps and randomly places the 4 maps in a predetermined map region. FIG. 7 is a schematic diagram of a random island level map according to an embodiment of this application. The electronic device places 4 island maps. 4 islands (4 squares with numbers) are randomly placed on the map. The 4 islands are randomly placed in the map region, and the 4 sub-level maps do not overlap with one another. Then, the electronic device sequentially takes the remaining 4 sub-level maps as current to-be-placed sub-level maps. The current maps do not overlap with the sub-level maps placed in the map region and are connected to at least one of the sub-level maps placed in the map region, so as to obtain a target map. That is, generation of islands in an island sub-level map may be completed.

The 8 sub-level maps selected from the sub-map library may include, but are not limited to, corresponding levels 1 to 8. That is, the 8 sub-level maps have a level order. The electronic device, when generating islands in the map, firstly sequentially randomly places sub-level maps corresponding to first 4 levels in the map region, but the 4 sub-level maps are required not to overlap with each other. Then, the electronic device sequentially places the remaining sub-level map 5, sub-level map 6, sub-level map 7 and sub-level map 8 in the map region. "Sequentially" may be understood as that fifth and sixth sub-level maps are all considered as the current to-be-placed sub-level maps, but the placement of the remaining 4 sub-level maps in the map region is required not to overlap with the sub-level maps placed in the map region and is required to be connected to at least one of the sub-level maps placed in the map region.

In some embodiments of this application, the sequentially placing to-be-placed sub-level maps, which meet a predetermined condition, of N–M sub-level maps in the map region includes the following steps:

S1. Determine, sequentially for current to-be-placed sub-level maps of the N–M sub-level maps, whether the target candidate region exists in the map region, where the target candidate region is used for placing place the current to-be-placed sub-level maps.

S2. Determine, in response to the determination that the target candidate region exists, the current to-be-placed sub-level maps as the to-be-placed sub-level maps which meet the predetermined condition, and place the current to-be-placed sub-level maps in the target candidate region of the map region.

The target candidate region includes, but is not limited to, a region meeting the predetermined condition. That is, when the to-be-placed sub-level maps are located in a target candidate region of the map region, the to-be-placed sub-level maps do not overlap with the sub-level maps placed in the map region and are connected to at least one of the sub-level maps placed in the map region.

The determining whether the target candidate region exists in the map region includes:

determining whether a target placement position corresponding to the current to-be-placed sub-level maps exists in the map region, where the target placement position is used for placing a central point of a first region in which the current to-be-placed sub-level maps are located, and when the central point is located at the target placement position, the first region does not overlap with all regions occupied by the sub-level maps placed in the map region, and a distance between at least one side in the first region and one side in the regions occupied by the sub-level maps placed in the map region is greater than 0 and less than a predetermined distance threshold; and determining, in response to the determination that the target placement position exists in the map region, that the target candidate region exists in the map region, where the target candidate region is the first region in which the current to-be-placed sub-level maps are located when the central point is located at the target placement position.

It is to be understood that a specific value of the predetermined distance threshold may be set according to an actual situation, which may be set to, for example, 50 m, 100 m or the like, and is not limited herein in this application.

Figure 8:
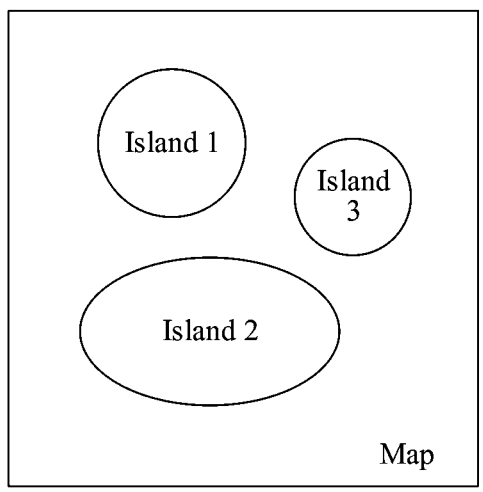
FIG. 8 is a schematic diagram showing that a main scenario of a game is an island group according to an embodiment of this application.

By taking random generation of islands as an example, a main scenario of a game shown in FIG. 8 is an island group. In FIG. 8, connectivity between islands may be defined as islands (sub-levels) being less than 50 meters apart (parameters are adjustable) and close enough to allow a player to move quickly from one island to another. For example, the player may quickly move from Island 1 to Island 3 and then from Island 3 to Island 2 by controlling a corresponding game character to swim in an island scenario. The target candidate region is a region meeting the predetermined condition. The electronic device places the current to-be-placed sub-level maps at a central point of a first region. The placed sub-level maps do not overlap with the sub-level maps placed in the map region, that is, regions occupied by Island 1, Island 2 and Island 3, and a distance between at least one side in the first region and one side in the regions occupied by the sub-level maps placed in the map region is greater than 0 and less than a predetermined distance threshold. For example, a distance from one side of any of Island 1, Island 2 and Island 3 is greater than 0 and less than 50 m. That is, the target candidate region for placing current sub-level maps meets the following condition: after a current sub-level map is placed, a region corresponding to the current sub-level map does not overlap with the regions occupied by the sub-level maps placed in the map region, and a distance between at least one side in the first region and one side in the regions occupied by the sub-level maps placed in the map region is greater than 0 and less than a predetermined distance threshold.

In practice, a first step of generating a random island algorithm is to generate a random island array. Weighted randomness is adopted herein. The electronic device randomly or sequentially selects the N sub-level maps without repetition from the sub-level map (such sub-levels are islands) library, and adds the N sub-level maps to the random island array. All islands in the array may be sequentially added to the map one by one.

A first step of a random island expansion algorithm is to generate a plurality of separate seed islands. For example, 4 separate seed islands are selected. In this case, the electronic device may set a value of a seed island parameter to 4; that is, iSeedIsland=4 (seed island parameter).

Figure 9:
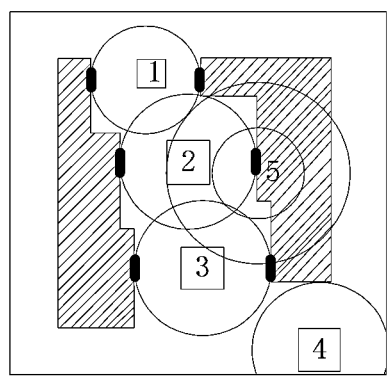
FIG. 9 is a schematic diagram of island expansion according to an embodiment of this application.

The seed islands may be very far apart (i.e., the first M sub-level maps of the N sub-level maps are sequentially randomly placed), regardless of connectivity. In this way, relatively separate island starting points may be generated, making the overall distribution of the islands more random. FIG. 9 is a schematic diagram of island expansion. In FIG. 9, a shaded region is a position at which next island (existing islands are Squares 1-4) may be placed with mutual exclusion taken into account. Black regions, tangent to the circles in FIG. 9, are positions at which the islands may be located, with connectivity taken into account. The next island (central point) may only be created at a position of the black regions. According to the algorithm, one may be randomly selected from all the black regions as a position of the next island.

Island 5 in FIG. 9 is the first randomly generated island which ensures the connectivity. Each time an island is added, the electronic device may refresh a current island distribution map once. Connectivity needs to be considered before all subsequent sub-levels are added to the map.

A specific step of randomly generating islands may include the following contents:

Step 1. The electronic device does not repeat extraction according to a weight of each sub-level map in a random map configuration table, until N sub-level maps are extracted. The electronic device stores the N sub-level maps into a LevelList, with subscripts counted from 0.

Step 2. The electronic device extracts the first sub-level map from the LevelList and places the first sub-level map in a big map, ensuring that the entire LevelList[0] is within an overall border of 2 km*2 km.

Step 3. The electronic device successively extracts subsequent iSeedIsland-1 sub-level maps and places the subsequent iSeedIsland-1 sub-level maps in a big scenario, ensuring that LevelList[0], LevelList[1], LevelList[iSeedIsland-1] do not overlap with one another. So far, a random seed island has been created.

Step 4. Starting with LevelList[iSeedIsland], the electronic device places the subsequent sub-level maps with the border and connectivity taken into account. The connectivity of island expansion is as follows: if two sub-level maps do not overlap and a distance of at least one side is ensured to be less than fAdjacentDist (the predetermined distance threshold, which may be 50 m), the two sub-level maps are considered connected. When LevelList[k] (k=iSeedIsland, iSeedIsland+1, . . . , N) remains connected to at least one previous level LevelList[i] (i=0, 1, 2, . . . , k−1), the LevelList[k] is considered connected to a previous sub-level map. The electronic device rasterizes the map into cells of 20 m*20 m. Through enumeration, it is easy to figure out where (the shaded region in FIG. 9) the LevelList[k] may be placed and where (the black regions tangent to the circles in FIG. 9) a newly-placed sub-level map may be connected to at least one of previous sub-level maps. If no shaded region or black region can be found in the entire map, the placement of the sub-level map is considered to have failed, and the LevelList[k] is directly skipped. Processing of Level-List[k+1] is started.

Step 5. The electronic device continuously performs step 4 until all the sub-level maps have been processed. Alternatively, a total area of placement of the sub-levels reaches a specified threshold fSaturateRatio (a predetermined sea to land ratio).

Main parameters of a random island chain algorithm are as follows:

iSeedIsland: It controls an initial separation state of the sub-levels.

fAdjacentDist: It controls a spatial agglomeration degree of connected sub-levels.

fSaturateRatio: It controls an overall water to land ratio of the map.

Each sub-level map has its own length and width attributes, with random weights to be extracted.

The distribution of islands can be well controlled using the random island chain algorithm, which meets experience of a variety of types of island war games.

In some embodiments of this application, the determining whether the target candidate region exists in the map region includes:

determining whether a target placement position corresponding to the current to-be-placed sub-level maps exists in the map region, where the target placement position is used for placing a central point of a first region in which the current to-be-placed sub-level maps are located, and when the central point is located at the target placement position, the first region does not overlap with all regions occupied by the sub-level maps placed in the map region, and at least one side in the first region overlaps with one side in the regions occupied by the sub-level maps placed in the map region; and determining, in response to the determination that the target placement position exists in the map region, that the target candidate region exists in the map region, where the target candidate region is the first region in which the current to-be-placed sub-level maps are located when the central point is located at the target placement position.

By taking random generation of mainland as an example, connectivity between the mainland means that a common straight side definitely exists between lots and that sides have to overlap completely, so that the connected sub-levels may form an entire mainland. Generation of a random mainland needs to take urban distribution and water-land connection into account. Buildings on the terrain may also be randomly generated to further enrich the experience of the shooting games.

A difference between the random mainland expansion algorithm and the random island algorithm is that the random mainland algorithm rasterizes the map into cells of 100 m*100 m, and a size of each sub-level map is fixed at 100 m*100 m. When two sub-level maps are connected, one side has to overlap. The overall flow of the mainland expansion algorithm is consistent with that of an island expansion algorithm.

Figure 10:
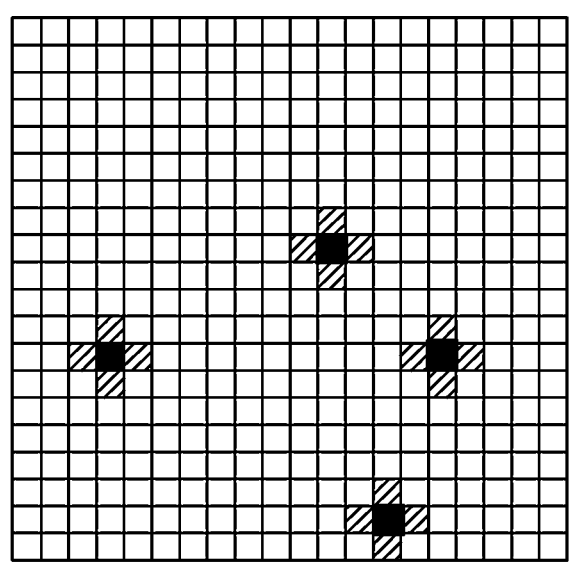
FIG. 10 is a schematic diagram of seed levels of a randomly generated mainland map according to an embodiment of this application.

FIG. 10 is a schematic diagram of seed levels of a randomly generated mainland map. In FIG. 10, small black cells are initial random seed levels, and the shaded regions are current global borders of all random seed levels. A mainland random algorithm is an expansion algorithm that needs to ensure perfect alignment of borders. (A mainland center map is black, and the shaded regions are transition maps of mainland centers toward the sea, generally expanded by one pixel toward the sea, which is generally a ramp). Mainland connectivity means that a black block needs to overlap with another black block in terms of borders.

A specific step of randomly generating mainland may include the following contents:

Step 1. The electronic device does not repeat extraction according to a weight of each sub-level map in a random map configuration table, until N sub-levels are extracted. The N sub-levels are stored into a LevelList, with subscripts counted from 0.

Step 2. The electronic device extracts the first sub-level map from the LevelList and places the first sub-level map in a big map, ensuring that the entire LevelList[0] is within an overall border of 2 km*2 km.

Step 3. The electronic device successively extracts subsequent iSeedIsland-1 sub-level maps and places the subsequent iSeedIsland-1 sub-level maps in a big scenario, ensuring that LevelList[0], LevelList[1], LevelList[iSeedIsland-1] do not overlap with one another. So far, a random seed island has been created.

Step 4. Starting with LevelList[iSeedIsland], the electronic device places the subsequent sub-level maps with the border and connectivity taken into account. Connectivity of expansion in a mainland map is as follows: a mainland random algorithm is an expansion algorithm that needs to ensure perfect alignment of borders. When LevelList[k] (k=iSeedIsland, iSeedIsland+1, . . . , N) remains connected to at least one previous sub-level map LevelList[i] (i=0, 1, 2, . . . , k-1), the LevelList[k] is considered connected to a previous level group. The map is rasterized into cells of 20 m*20 m. Through enumeration, it is easy to figure out where (the shaded region in FIG. 9) the LevelList [k] may be placed and where (the black regions tangent to the circles in FIG. 9) a newly-placed sub-level map may be connected to at least one of previous sub-level maps. If no shaded region can be found in the entire map, the placement of the sub-level map is considered to have failed, and the LevelList[k] is directly skipped. Processing of LevelList[k+1] is started.

Step 5. The electronic device continuously performs step 4 until all the sub-levels have been processed. Alternatively, a total area of placement of the sub-level maps reaches a specified threshold fSaturateRatio (orange or orange+green).

Differences between the expansion of mainland maps and the expansion of island maps are as follows: there are transitions between island maps; and the mainland map is a complete level.

Figure 11:
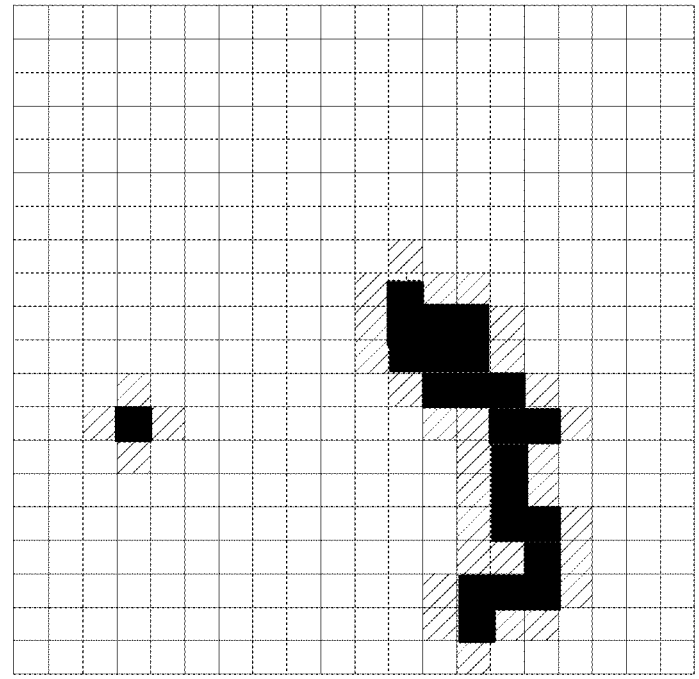
FIG. 11 is a first schematic diagram of a random mainland generation process according to an embodiment of this application.
Figure 12:
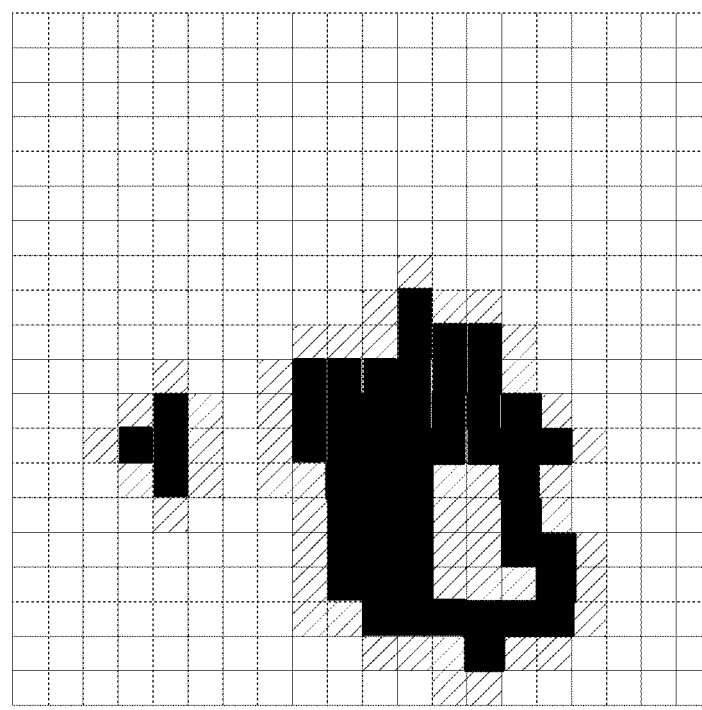
FIG. 12 is a second schematic diagram of a random mainland generation process according to an embodiment of this application.
Figure 13:
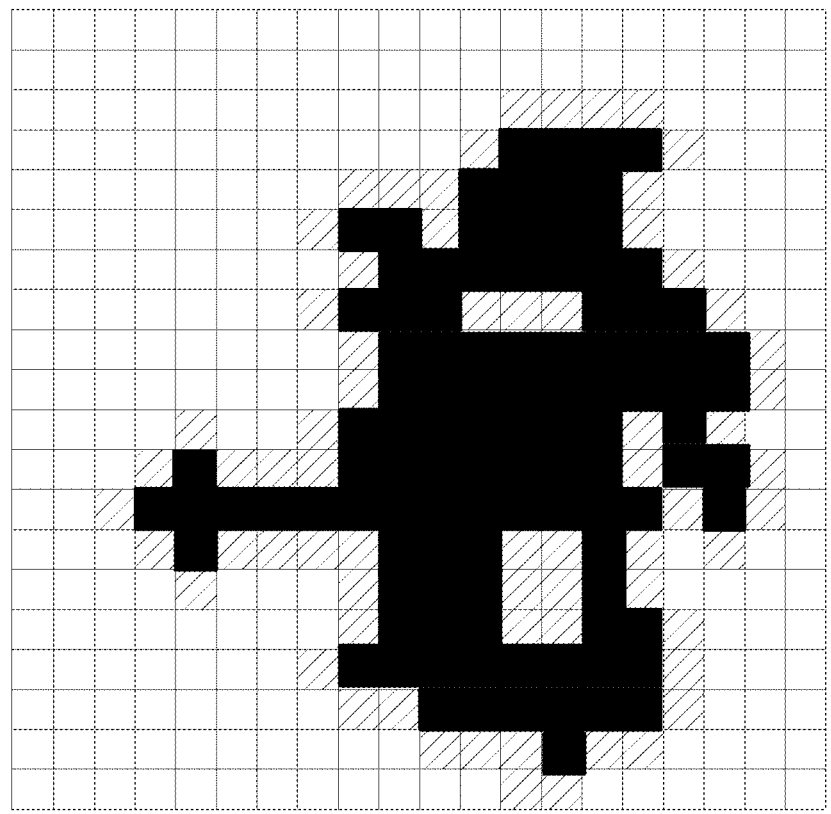
FIG. 13 is a third schematic diagram of a random mainland generation process according to an embodiment of this application.

FIG. 11 to FIG. 13 are schematic diagrams of a random mainland generation process. Black cells, that is, black regions, are land regions of the mainland. Shaded cells, that is, shaded regions, are border lines of the mainland. The electronic device expands the black cells based on the random seed levels in FIG. 10, i.e. the black cells in FIG. 10. During each expansion, any shaded cell around the black cells may be taken as a new black cell to obtain a land region. At the same time, a white cell next to the black cells is changed into a new shaded cell so as to obtain a map border line, or a boundary between land and water. The electronic device continues to expand over the land regions shown in FIG. 11 so as to obtain land regions and border lines shown in FIG. 12, then continues to expand the land regions on the basis of FIG. 12, and stops expanding until the sea to land ratio reaches a target value.

FIG. 13 is a schematic diagram of a mainland area resulting from an expansion. After a mainland connectivity map is generated, the electronic device has to perform some special processing for 3D shooting games to ensure game experience.

The electronic device may randomly generate urban regions after randomly generating a mainland map. A specific step of generating urban regions is as follows:

During random generation of big urban regions, as shown in FIG. 13, cells in an entire black region are land regions, but such mainland cells are only 100 m*100 m, and it is impossible to create a complete city scenario on such small cells. Most shooting games have cities ranging in size from 200 m*200 m to 300 m*300 m, cities need to be generated on the mainland, that is, small black cells are merged, and urban siting is required.

Figure 14:
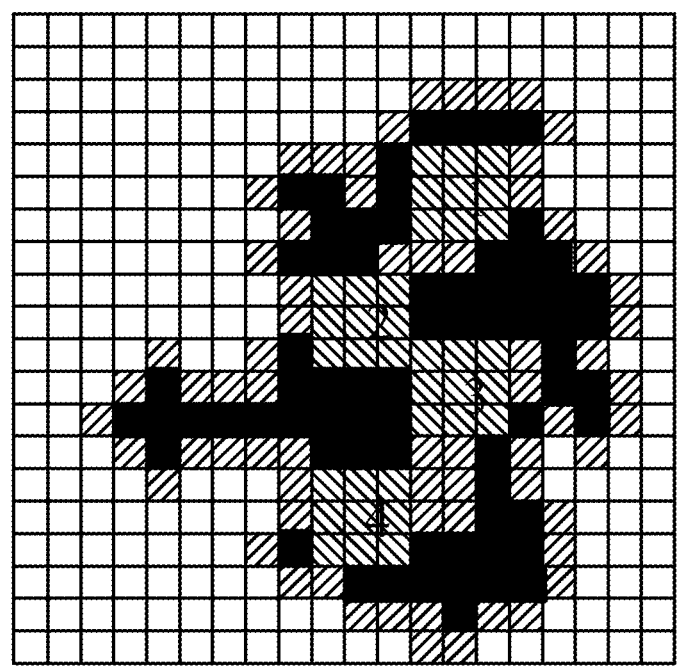
FIG. 14 is a schematic diagram showing that a big city may be randomly found according to an algorithm according to an embodiment of this application.

The electronic device calculates a quantity of adjacent black cells around each black cell. The black cell around which are 8 adjacent black cells is definitely a center of a land lot of 300 m*300 m. The electronic device randomly screens out part of such regions, which are wholly replaced with a big level map block of 300 m*300 m. A target quantity of big urban regions needs to be set herein. After each big urban region is generated, a to-be selected region in which a big urban region may be generated is refreshed. When the target quantity of the big urban regions is found, or there are no regions in which the big urban regions may be generated, the process of searching for big urban regions is terminated. FIG. 14 is a schematic diagram showing that an electronic device may randomly find a big city. As shown in FIG. 14, the electronic device calculates a quantity of black cells around each black cell in the mainland region shown in FIG. 13. In a case that a quantity of black cells around a black cell is 8, the black cell and 9 black cells around the black cell are merged into a region to obtain Region 1, Region 2, Region 3 and Region 4. The four regions are large level map blocks, which can be used for placing big urban regions. In FIG. 14, the electronic device places City 1, City 2, City 3 and City 4 in the four regions respectively.

Figure 15:
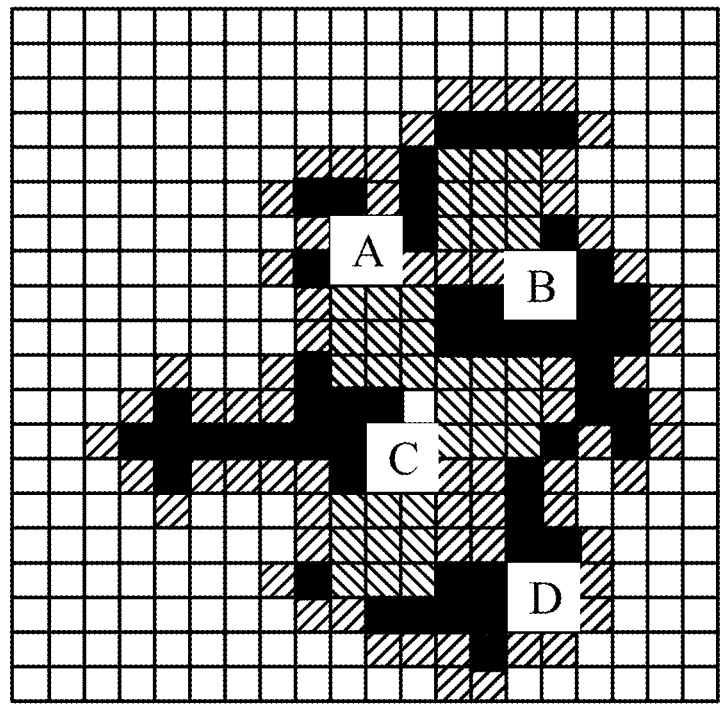
FIG. 15 is a schematic diagram of an entire mainland after addition of a city map according to an embodiment of this application.

A random generation process of a medium urban region is basically the same as the generation process of the big urban region. The electronic device randomly screens out a plurality of cells of 200 m*200 m from the remaining black regions. This may be determined by determining whether on the right of, below, and right below each black cell are black cells. FIG. 15 is a schematic diagram of an entire mainland after addition of a city map. The electronic device may determine whether on the right of, below, and right below each of the remaining black cells are black cells. In a case that on the right of, below, and right below a black cell are black cells, the electronic device merges the black cell and the three cells on the right of, below, and right below the black cell to obtain a region. Medium urban regions of 200 m*200 m may be placed in such regions. In this manner, 4 medium urban regions, that is, Urban region A, Urban region B, Urban region C and Urban region D, shown in FIG. 15 can be obtained.

The electronic device may also generate islands or mainland using other random algorithms. For example, points may be randomly placed in a 2D plane, then cluster centers may be generated by clustering to generate positions of sub-level maps, and the sub-level maps are merged in combination with connectivity to generate island chains or mainland.

It is more reasonable to define the connectivity through bitmap comparison. The electronic device rasterizes each sub-level map into a bitmap, with 0 representing sea and 1 representing land. The connectivity is defined by a pixel distance between the bitmaps, which can more appropriately describe a distance between levels with irregular contours.

In the random mainland generation method, firstly, the map may be rasterized into small cells of 100 m*100 m, relatively discrete city distribution is generated using a random island chain algorithm, and cities are regarded as random seed levels; then, mainland filling sub-blocks are generated by border neighboring expansion to generate corresponding sea-land connection blocks, until a target sea to land ratio value is reached.

In some embodiments of this application, when the current to-be-placed sub-level maps are placed in the target candidate region of the map region, the method further includes:

providing, in the map region, a target transition map on an idle region adjacent to the target candidate region, where the target transition map is used for connecting the current to-be-placed sub-level maps with the idle region, the idle region is a region, which is not provided with the sub-level maps and a transition map of a target type, in the map region, and the target transition map is of the target type.

That is, when the electronic device places the current to-be-placed sub-level maps in the target candidate region, a transition map may also be provided to make sure that to-be-placed sub-level maps are connected to the idle region as smoothly as possible. For example, smooth connection between an urban region and sea level (a region in which the urban region is located in the target candidate region, and the sea level is the idle region) by providing downhill terrain.

The target transition region may include, but is not limited to, connecting the mainland and islands randomly generated in this application.

The providing, in the map region, a target transition map on an idle region adjacent to the target candidate region includes:

acquiring a target vertex connected to a vertex of the target candidate region and in vertices of the idle region in which the target transition map is located;

setting a height of the target vertex in the map region to a first height, where a height of the vertex of the target candidate region in the map region is the first height; and setting a height of the vertices of the idle region other than the target vertex in the map region to a second height, where the second height is less than the first height.

In practice, the overall structure of the mainland and the distribution of urban regions have been processed, and sea-land connection may be processed next. In this case, the electronic device may first place the current to-be-placed sub-level maps (such as big city level maps), and select an idle region adjacent to the target candidate region from regions without any sub-level map and idle regions of the transition map. Since the selected idle region is adjacent to the target candidate region, the idle region may definitely have a vertex connected to the target candidate region. The vertex is the target vertex. The electronic device sets the height of the target vertex to a higher first height because the target candidate region used for placing place the to-be-placed sub-level maps is bound to be higher than the sea level, and then sets a height of other vertices of the selected idle region other than the target vertex to a lower second height, for example, a height of the sea level. Then, the electronic device may set a transition curve gently transitioning from the first height to the second height, and fill positions of the transition curve with downhill terrain or seawater, so as to realize the sea-land connection.

The sea-land connection requires some hard-and-fast rules on the sub-level maps. All land terrain levels require a height of a terrain border to be equal to a predetermined threshold, for example, 5 m, 10 m or the like.

Figure 16:
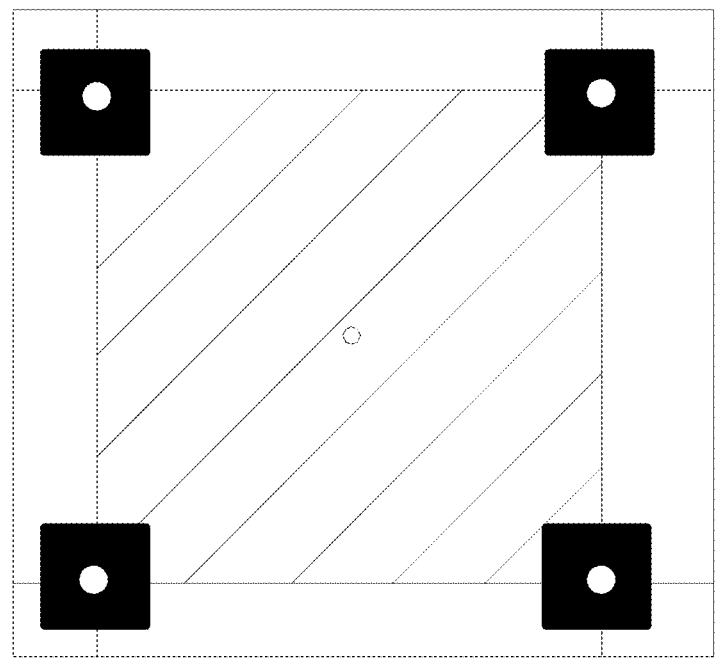
FIG. 16 is a schematic diagram of positions for generation of transition levels according to an embodiment of this application.

FIG. 16 is a schematic diagram of positions for generation of transition levels. As shown in FIG. 16, special transition levels may be created in shaded regions to process the sea-land connection. In the shaded regions (idle regions), it is only necessary to consider whether four vertices thereof are connected to a vertex (a vertex of a target candidate region) of a terrain level (the target candidate region, which may be an urban terrain level or an island terrain level). All borders of the terrain levels are 5 m high. Therefore, the height of the vertex (the target vertex) of the shaded region has to be set to 5 m (the first height)whenever the terrain level is connected to the shaded region.

Figure 17:
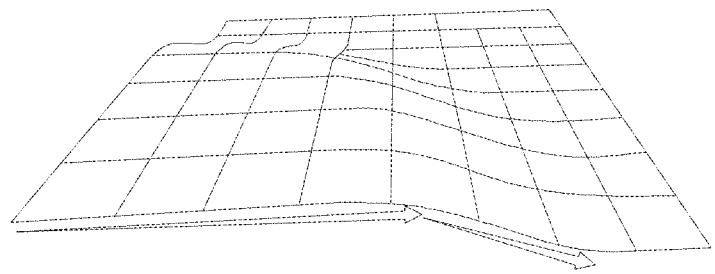
FIG. 17 is a schematic diagram of overlapping of height curves of transition levels according to an embodiment of this application.

Each vertex has a value of 5 m or 0 m. The transition levels are of $2^4=16$ types totally (in fact, the type with four vertices having a height of 0 may be removed, and 8 cells around such a lot are water). The vertex of the transition level connected to the land has a height of 5 m, and vertices not connected to the land have a height of 0 m (the second height). The main terrain is seawater, and a variety of coastline transitions may be designed freely under the heights of the vertices. An edge surface height of the connection level needs to be ensured as shown in FIG. 17, which is a schematic diagram of overlapping of height curves of transition levels. Height transition curves (transitioning from 5 m to 0 m) as shown in FIG. 17 can well overlap.

A complete mainland random algorithm has been completed with mainland lot connection, random generation of urban regions and sea-land terrain connection taken into account.

The sub-level maps are classified as follows according to functions thereof: big city level maps of 300 m*300 m, small city level maps of 200 m*200 m, land terrain level maps of 100 m*100 m with a vertex height of 5 m, and 15 types of transition level maps of 100 m*100 m with different vertex heights.

The electronic device needs to make a large quantity of sub-level maps to ensure enough differences in each randomization. The electronic device may also customize land lots of various shapes to replace the remaining sub-level maps. For example, three yellow sub-level maps are replaced with a long mountain terrain level of 300 m*100 m. It is only necessary to ensure that borders of land-based sub-levels have to be about 5 m. The borders may randomly fluctuate, and fewer borders are allowed to overlap between levels to make boundaries more natural.

In some embodiments of this application, after the sequentially placing to-be-placed sub-level maps, which meet a predetermined condition, of N–M sub-level maps in the map region, the method further includes:

determining, when each sub-level map placed in the map region occupies one cell in the map region, whether a target cell exists in the cell occupied by the sub-level map, where a quantity of cells that are connected to the target cell and occupied by the sub-level maps placed in the map region is greater than or equal to a predetermined quantity threshold; and combining, in response to the determination that the target cell exists, the target cell and sub-level maps on the cells that are connected to the target cell and occupied by the sub-level maps placed in the map region to form a target level map.

The target cell may be a cell that places a sub-level map of specified terrain, for example, a cell that places a big urban region, or a cell that places an island. That is, the electronic device, after placing the to-be-placed sub-level maps in the map region, may further determine whether specified terrain exists in the map region, and when the specified terrain exists in the map region, may use all the placed sub-level maps and the sub-level map corresponding to the target cell to form a target level map as required, for example, form a target level map required to have a big city or form a target level map required to have an island, so as to obtain a variety of maps meeting various scenario conditions.

Through the solution according to this application, N sub-level maps are selected from a sub-level map library, N being a natural number greater than 1; first M sub-level maps of the N sub-level maps are sequentially placed in a predetermined map region, N>M, the first M sub-level maps being all located in the map region, and the first M sub-level maps not overlapping with each other; and to-be-placed sub-level maps, which meet a predetermined condition, of N–M sub-level maps are sequentially placed in the map region to obtain a target map, the N–M sub-level maps being sub-level maps of the N sub-level maps other than the first M sub-level maps, and the predetermined condition including: when the to-be-placed sub-level maps are located in a target candidate region of the map region, the to-be-placed sub-level maps not overlapping with the sub-level maps placed in the map region and being connected to at least one of the sub-level maps placed in the map region; which achieves a purpose that a basic random unit is a sub-level map on the basis of sub-level splicing, so as to achieve a technical effect of generating a random big map according to a random sub-level map, thereby solving the technical problem of poor flexibility in generation of a large-scale random map in the related art. That is, the flexibility in generation the large-scale random map is improved.

In some embodiments of this application, the sequentially placing to-be-placed sub-level maps, which meet a predetermined condition, of N–M sub-level maps in the map region includes:

determining whether an area of the sub-level maps placed in the map region exceeds a predetermined area threshold after an $i^{th}$ sub-level map of the N sub-level maps is placed in the map region, where M<i<N; and stopping placing $(i+1)^{th}$ to $N^{th}$ sub-level maps of the N sub-level maps in the map region when the area of the sub-level maps placed in the map region exceeds the predetermined area threshold.

In practice, the area of the map region is limited, and not all of the N sub-level maps selected may be usable. In this case, the electronic device may determine whether the area of the sub-level maps placed in the map region exceeds the predetermined area threshold while placing the sub-level maps in the map region. In a case that the area of the sub-level maps placed in the map region exceeds the predetermined area threshold, which indicates that enough sub-level maps have been placed in the map region, the electronic device may stop placing the remaining sub-level maps. In a case that the area of the sub-level maps placed in the map region does not exceed the predetermined area threshold, which indicates that sub-level maps can be continuously placed in the map region, the electronic device may continuously place the sub-level maps until the area of the sub-level maps placed reaches the predetermined area threshold.

It is to be understood that the predetermined area threshold may be set according to an actual situation. For example, the predetermined area threshold is set to 15 km$^2$ or even 50 km$^2$, which is not limited herein in this application.

In some embodiments, after a city level map is generated, buildings on the city level map also need to be randomly processed. The electronic device first marks positions of blocks on the city level map at which buildings may be placed, the positions of blocks are similar to foundations. Then, the electronic device randomly generates a variety of buildings on the positions of blocks at which the buildings are placed. Thus, random cities and random building groups are realized. Certainly, in some other embodiments, the electronic device may further generate preset buildings at the positions of blocks at which buildings may be placed, for example, generate landmark buildings, generate designed buildings, or the like.

A pseudo-random level generation method is added in addition to the random algorithm. The electronic device saves positions of the sub-level maps and building types on the random map as configuration, and may also provide each sub-level map with navigation data and save the navigation data as configuration. Each level randomization actually means reading the configuration and loading a pseudo-random map designed in advance. When a quantity of pseudo-random levels configured is abundant to a certain extent, fresh experience for players can be well ensured. Each sub-level map of the pseudo-random levels is planned and accepted, which may ensure good experience for a single round of the game.

The probability of each well-designed level appearing in a random map mode may be specified by combining the random algorithm with pseudo-random configuration. A specific gameplay map can also be placed at a particular time.

The implementation solution according to this application may create new experience for shooting gameplay every time, and the map may never be repeated.

Figure 18:
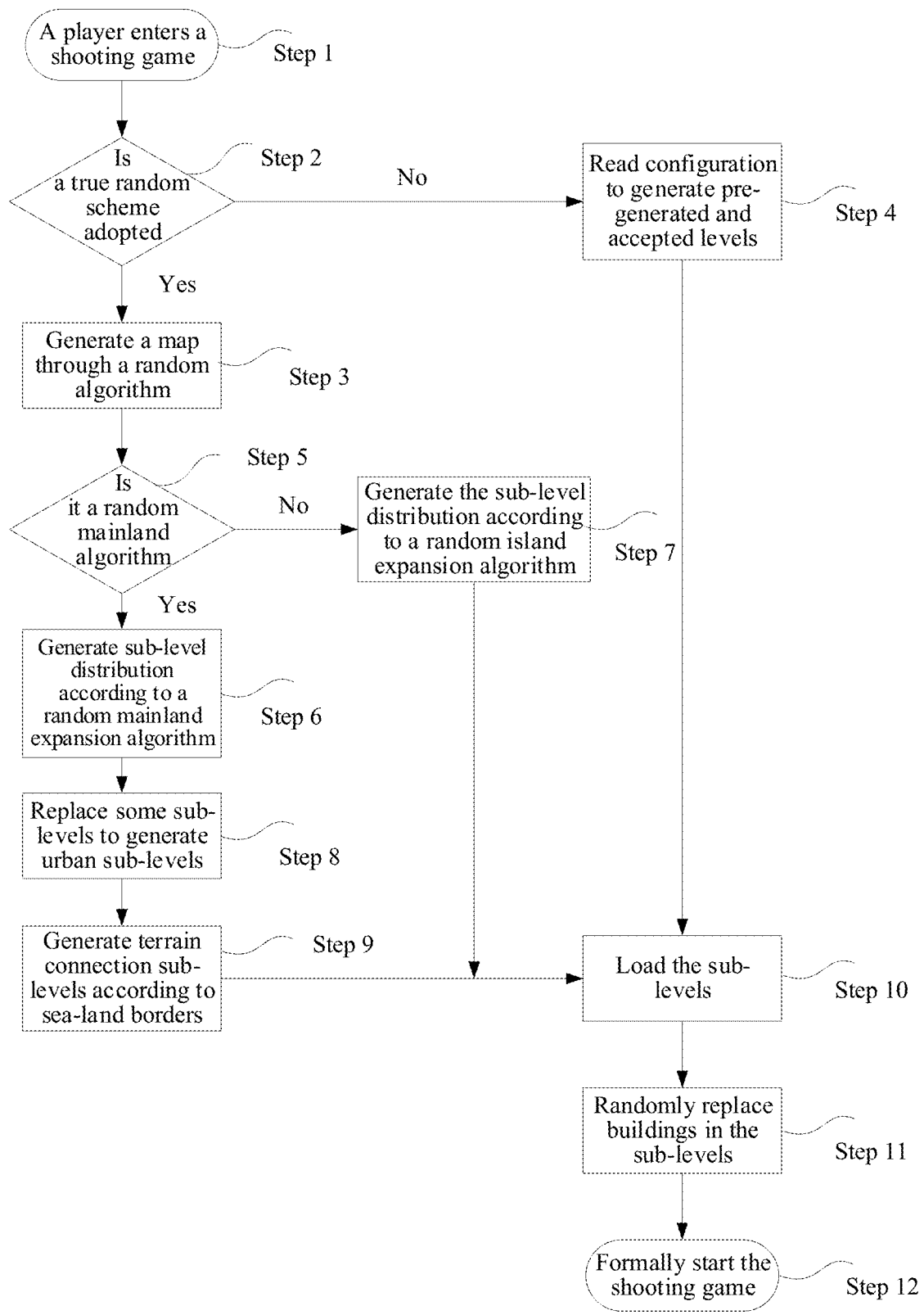
FIG. 18 is a flowchart of a random map generation method in a shooting game according to an embodiment of this application.

The following is an introduction to the application of the map generation method according to this application to an actual scenario. FIG. 18 is a flowchart of a random map generation method in a shooting game.

Step 1. A player enters the shooting game.
Step 2. Determine whether a true random scheme is adopted, and perform step if yes; otherwise, perform step 4.
Step 3. Generate a map through a random algorithm (randomly generate terrain).
Step 4. Read configuration to generate pre-generated and accepted levels (read configuration and load a pseudo-random map designed in advance).
Step 5. Determine whether it is a random mainland algorithm, and perform step 6 if yes; otherwise, perform step 7.
Step 6. Generate sub-level distribution according to a random mainland expansion algorithm (randomly generate a mainland by using a sub-level map).
Step 7. Generate the sub-level distribution according to a random island expansion algorithm (randomly generate an island by using a sub-level map).
Step 8. Replace some sub-levels to generate urban sub-levels (urban siting).
Step 9. Generate terrain connection sub-levels according to sea-land borders (provide a target transition map).
Step 10. Load the sub-levels.
Step 11. Randomly replace buildings in the sub-levels.
Step 12. Formally start the shooting game.

For brief description, the foregoing method embodiments are redisplayed as a series of action combinations. However, a person skilled in the art is to appreciate that this application is not limited to the described order of the actions, because according to this application, some steps may be performed in other orders or simultaneously. In addition, a person skilled in the art is further to understand that the embodiments described in this specification are all exemplary embodiments, and the involved actions and modules are not necessarily required by this application.

Figure 19:
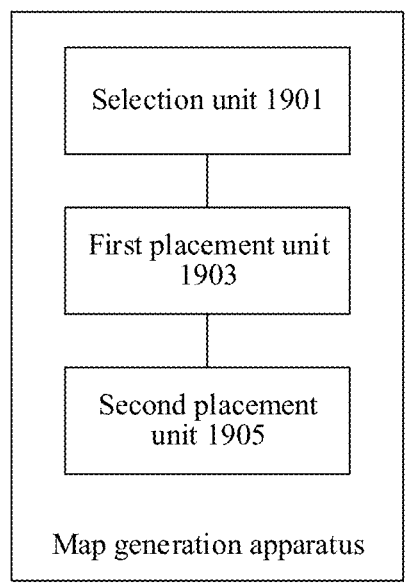
FIG. 19 is a schematic structural diagram of a map generation apparatus according to an embodiment of this application.

An embodiment of this application provides a map generation apparatus configured to implement the map generation method described above. As shown in FIG. 19, the map generation apparatus includes: a selection unit 1901, a first placement unit 1903 and a second placement unit 1905.

The selection unit 1901 is configured to select N sub-level maps from a sub-level map library, N being a natural number greater than 1.

The first placement unit 1903 is configured to sequentially place first M sub-level maps of the N sub-level maps in a predetermined map region, N>M, the first M sub-level maps being all located in the map region, and the first M sub-level maps not overlapping with each other.

The second placement unit 1905 is configured to sequentially place to-be-placed sub-level maps, which meet a predetermined condition, of N−M sub-level maps in the map region to obtain a target map, the N−M sub-level maps being sub-level maps of the N sub-level maps other than the first M sub-level maps, and the predetermined condition including: when the to-be-placed sub-level maps are located in a target candidate region of the map region, the to-be-placed sub-level maps not overlapping with the sub-level maps placed in the map region and being connected to at least one of the sub-level maps placed in the map region.

Through the embodiment according to this application, the selection unit 1901 selects N sub-level maps from a sub-level map library, N being a natural number greater than 1; the first placement unit 1903 sequentially places first M sub-level maps of the N sub-level maps in a predetermined map region, N>M, the first M sub-level maps being all located in the map region, and the first M sub-level maps not overlapping with each other; and the second placement unit 1905 sequentially places to-be-placed sub-level maps, which meet a predetermined condition, of N−M sub-level maps in the map region to obtain a target map, the N−M sub-level maps being sub-level maps of the N sub-level maps other than the first M sub-level maps, and the predetermined condition including: when the to-be-placed sub-level maps are located in a target candidate region of the map region, the to-be-placed sub-level maps not overlapping with the sub-level maps placed in the map region and being connected to at least one of the sub-level maps placed in the map region. In this manner, a purpose that a basic random unit is a sub-level map on the basis of sub-level splicing is achieved, so as to achieve a technical effect of generating a random big map according to a random sub-level map, thereby solving the technical problem of poor flexibility in generation of a large-scale random map in the related art.

In some embodiments of this application, the first placement unit 1903 includes:
a first determination module configured to determine, sequentially for current to-be-placed sub-level maps of the N−M sub-level maps, whether the target candidate region exists in the map region, where the target candidate region is configured to place the current to-be-placed sub-level maps; and a placement module configured to determine, in response to the determination that the target candidate region exists, the current to-be-placed sub-level maps as the to-be-placed sub-level maps which meet the predetermined condition, and place the current to-be-placed sub-level maps in the target candidate region of the map region.

The first determination module includes:

a first determination sub-module configured to determine whether a target placement position corresponding to the current to-be-placed sub-level maps exists in the map region, where the target placement position is configured to place a central point of a first region in which the current to-be-placed sub-level maps are located, and when the central point is located at the target placement position, the first region does not overlap with all regions occupied by the sub-level maps placed in the map region, and a distance between at least one side in the first region and one side in the regions occupied by the sub-level maps placed in the map region is greater than 0 and less than a predetermined distance threshold; and a second determination sub-module configured to determine, in response to the determination that the target placement position exists in the map region, that the target candidate region exists in the map region, where the target candidate region is the first region in which the current to-be-placed sub-level maps are located when the central point is located at the target placement position.

The first determination module includes:

a third determination sub-module configured to determine whether a target placement position corresponding to the current to-be-placed sub-level maps exists in the map region, where the target placement position is used for placing a central point of a first region in which the current to-be-placed sub-level maps are located, and when the central point is located at the target placement position, the first region does not overlap with all regions occupied by the sub-level maps placed in the map region, and at least one side in the first region overlaps with one side in the regions occupied by the sub-level maps placed in the map region; and a fourth determination sub-module configured to determine, in response to the determination that the target placement position exists in the map region, that the target candidate region exists in the map region, where the target candidate region is the first region in which the current to-be-placed sub-level maps are located when the central point is located at the target placement position.

In some embodiments of this application, the map generation apparatus may further include:

a third setting unit configured to provide, when the current to-be-placed sub-level maps are placed in the target candidate region of the map region, in the map region, a target transition map on an idle region adjacent to the target candidate region, where the target transition map is configured to connect the current to-be-placed sub-level maps with the idle region, the idle region is a region, which is not provided with the sub-level maps and a transition map of a target type, in the map region, and the target transition map is of the target type.

The third setting unit includes:

an acquisition module configured to acquire a target vertex connected to a vertex of the target candidate region and in vertices of the idle region in which the target transition map is located;

a first setting module configured to set a height of the target vertex in the map region to a first height, where a height of the vertex of the target candidate region in the map region is the first height; and a second setting module configured to set a height of the vertices of the idle region other than the target vertex in the map region to a second height, where the second height is less than the first height.

In some embodiments of this application, the map generation apparatus may further include:

a determination unit configured to, after the sequentially placing of the to-be-placed sub-level maps, which meet the predetermined condition, of N−M sub-level maps in the map region, determine, when each sub-level map placed in the map region occupies one cell in the map region, whether a target cell exists in the cell occupied by the sub-level map, where a quantity of cells that are connected to the target cell and occupied by the sub-level maps placed in the map region is greater than or equal to a predetermined quantity threshold; and a composing unit configured to combine, in response to the determination that the target cell exists, the target cell and sub-level maps on the cells that are connected to the target cell and occupied by the sub-level maps placed in the map region to form a target level map.

The first placement unit 1903 may include:

a second determination module configured to determine whether an area of the sub-level maps placed in the map region exceeds a predetermined area threshold after an $i^{th}$ sub-level map of the N sub-level maps is placed in the map region, where M<i<N; and a stopping module configured to stop placing $(i+1)^{th}$ to $N^{th}$ sub-level maps of the N sub-level maps in the map region when the area of the sub-level maps placed in the map region exceeds the predetermined area threshold.

In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

Figure 20:
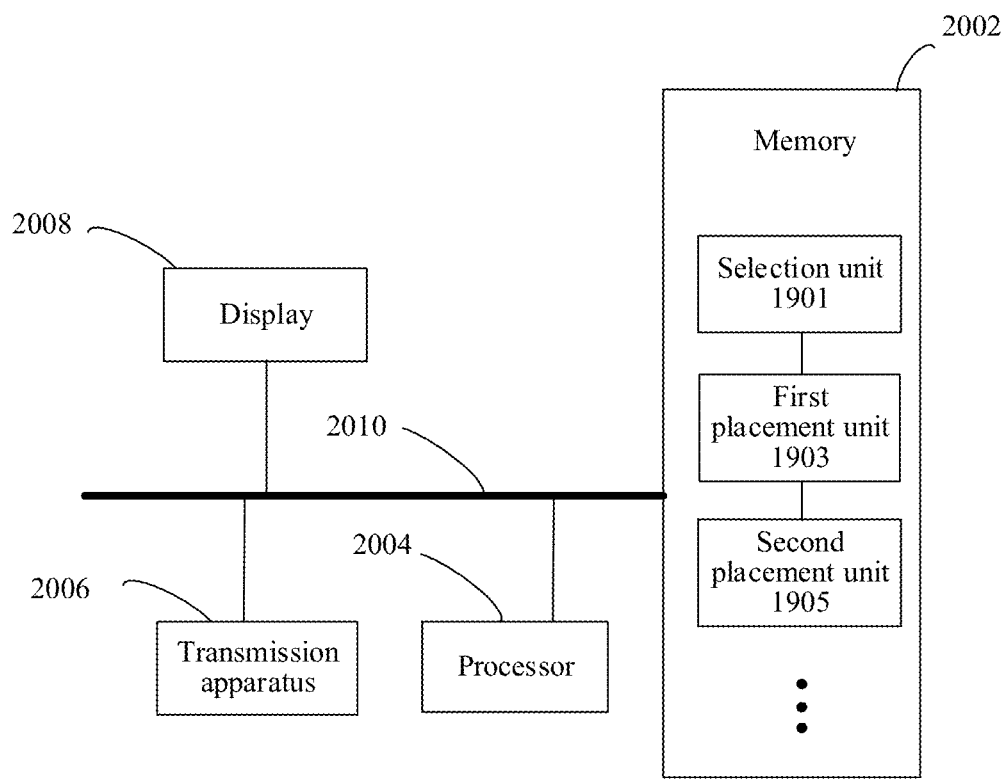
FIG. 20 is a schematic structural diagram of an electronic apparatus for a map generation method according to an embodiment of this application.

According to the embodiments of this application, an electronic device for implementing the foregoing map generation method is further provided. As shown in FIG. 20, the electronic device includes a memory 2002 and a processor 2004. The memory 2002 stores a computer program, and the processor 2004 is configured to perform the steps in any one of the above method embodiments through the computer program.

In this embodiment of this application, the electronic device may be located in at least one of a plurality of network devices in a computer network.

In this embodiment of this application, the processor may be configured to perform the following steps by using the computer program:

S1. Select N sub-level maps from a sub-level map library, N being a natural number greater than 1.

S2. Sequentially place first M sub-level maps of the N sub-level maps in a predetermined map region, N>M, the first M sub-level maps being all located in the map region, and the first M sub-level maps not overlapping with each other.

S3. Sequentially place to-be-placed sub-level maps, which meet a predetermined condition, of N–M sub-level maps in the map region to obtain a target map, N–M sub-level maps being sub-level maps of the N sub-level maps other than the first M sub-level maps, and the predetermined condition including: when the to-be-placed sub-level maps are located in a target candidate region of the map region, the to-be-placed sub-level maps not overlapping with the sub-level maps placed in the map region and being connected to at least one of the sub-level maps placed in the map region.

Optionally, a person of ordinary skill in the art may understand that, the structure shown in FIG. 20 is only illustrative. The electronic device may be a terminal device such as a smartphone (such as an Android mobile phone or an iOS mobile phone), a tablet computer, a palmtop computer, a MID, or a PAD. FIG. 20 does not limit the structure of the electronic device. For example, the electronic device may further include more or fewer components (such as a network interface) than those shown in FIG. 20, or have a configuration different from that shown in FIG. 20.

The memory 2002 may be configured to store a software program and module, for example, executable instructions/modules corresponding to the map generation method and apparatus in the embodiments of this application. The processor 2004 runs the executable instructions and modules stored in the memory 2002 to implement various functional applications and data processing, that is, implement the map generation method described above. The memory 2002 may include a high-speed random memory, and may also include a non-volatile memory, for example, one or more magnetic storage apparatuses, a flash memory, or another non-volatile solid-state memory. In some embodiments, the memory 2002 may include memories remotely disposed relative to the processor 2004, and the remote memories may be connected to a terminal through a network. Examples of the network include, but are not limited to, the Internet, an intranet, a local area network, a mobile communication network and a combination thereof. The memory 2002 may be specifically configured to, but is not limited to, store information such as the sub-level map library and the sub-level maps. In an example, as shown in FIG. 20, the memory 2002 may include, but is not limited to, the selection unit 1901, the first placement unit 1903 and the second placement unit 1905 in the map generation apparatus. In addition, the memory may further include, but is not limited to, other modules or units in the foregoing map generation apparatus, and details are not described in this example again.

In some embodiments of this application, the transmission module 2006 in the electronic device is configured to receive or transmit data by using a network. A specific example of the foregoing network may include a wired network and a wireless network. In an example, the transmission apparatus 2006 includes a network interface controller (NIC). The NIC may be connected to another network device and a router by using a network cable, to communicate with the Internet or a local area network. In an example, the transmission apparatus 2006 is a radio frequency (RF) module, which communicates with the Internet in a wireless manner.

In addition, the electronic device may further include: a display 2008 configured to display the to-be-placed sub-level maps; and a connection bus 2010 configured to connect the module components in the electronic apparatus.

Correspondingly, an embodiment of this application further provides a computer storage medium storing executable instructions, the executable instructions being configured to perform steps in any one of the above method embodiments at runtime.

In this embodiment of this application, the computer storage medium may be configured to store executable instructions configured to perform the following steps:

S1. Select N sub-level maps from a sub-level map library, N being a natural number greater than 1.

S2. Sequentially place first M sub-level maps of the N sub-level maps in a predetermined map region, N>M, the first M sub-level maps being all located in the map region, and the first M sub-level maps not overlapping with each other.

S3. Sequentially place to-be-placed sub-level maps, which meet a predetermined condition, of N–M sub-level maps in the map region to obtain a target map, N–M sub-level maps being sub-level maps of the N sub-level maps other than the first M sub-level maps, and the predetermined condition including: when the to-be-placed sub-level maps are located in a target candidate region of the map region, the to-be-placed sub-level maps not overlapping with the sub-level maps placed in the map region and being connected to at least one of the sub-level maps placed in the map region.

In some embodiments of this application, the computer storage medium may also be configured to store executable instructions for performing the map generation method in any embodiment of this application.

In this embodiment of this application, a person of ordinary skill in the art may understand that all or some of the steps of the methods in the foregoing embodiments may be implemented by a program instructing relevant hardware of the terminal device. The program may be stored in a computer storage medium, and the storage medium may include a flash disk, a read-only memory (ROM), a random access memory (RAM), a magnetic disk, an optical disc, or the like.

When the integrated unit in the foregoing embodiments is implemented in the form of a software functional unit and sold or used as an independent product, the integrated unit may be stored in the foregoing computer storage medium. Based on such an understanding, the technical solutions of this application essentially, or the part contributing to the related art, or all or some of the technical solutions may be implemented in a form of a software product. The computer software product is stored in a storage medium and includes several instructions for instructing one or more computer devices (which may be a personal computer, a server, a network device, and the like) to perform all or some of the steps of the methods described in the embodiments of this application.

In the foregoing embodiments of this application, descriptions of the embodiments have respective focuses. As for parts that are not described in detail in one embodiment, reference may be made to the relevant descriptions of the other embodiments.

In the several embodiments provided in this application, it is to be understood that, the disclosed client may be implemented in another manner. The apparatus embodiments described above are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electrical or other forms.

The units described as separate components may or may not be physically separated, and the components displayed as units may or may not be physical units, and may be located in one place or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

The foregoing descriptions are merely exemplary implementations of this application. A person of ordinary skill in the art may further make several improvements and modifications without departing from the principle of this application, and the improvements and modifications are also considered as falling within the protection scope of this application.

What is claimed is:

1. A map generation method performed by an electronic device, the method comprising:
   randomly placing first M sub-level maps of N sub-level maps in a predetermined map region, N>M, and the first M sub-level maps not overlapping with each other and at least one of the first M sub-level maps is not connected to the others of the first M sub-level maps;
   selecting, among the remaining N-M sub-level maps, one or more to-be-placed sub-level maps; and
   iteratively placing the to-be-placed sub-level maps at target candidate regions adjacent the at least one of the first M sub-level maps in accordance with a predetermined condition to obtain a target map, wherein the predetermined condition comprises: after a to-be-placed sub-level map is placed at one of the target candidate regions, the sub-level map is connected to the at least one of the first M sub-level maps.

2. The method according to claim 1, wherein the iteratively placing the to-be-placed sub-level maps at target candidate regions adjacent the at least one of the first M sub-level maps in accordance with a predetermined condition to obtain a target map comprises:
   determining, for a currently to-be-placed sub-level map, a target candidate region that meets the predetermined condition; and
   placing the currently to-be-placed sub-level map in the target candidate region.

3. The method according to claim 2, wherein the determining, for a currently to-be-placed sub-level map, a target candidate region that meets the predetermined condition comprises:
   determining that a target placement position corresponding to the currently to-be-placed sub-level map exists adjacent the at least one of the first M sub-level maps in the map region, wherein the target placement position is used for placing a central point of a first region in which the currently to-be-placed sub-level map are located and a distance between at least one side in the first region and one side in the regions occupied by existing sub-level maps placed in the map region is greater than 0 and less than a predetermined distance threshold; and
   determining that the target candidate region exists in the map region.

4. The method according to claim 3, wherein when the currently to-be-placed sub-level maps is placed in the target candidate region of the map region, the method further comprises:
   providing, in the map region, a target transition map on an idle region adjacent to the target candidate region, wherein the target transition map is used for connecting the currently to-be-placed sub-level map to the target candidate region.

5. The method according to claim 1, wherein the method further comprises:
   identifying a target cell occupied by a sub-level map, wherein a quantity of cells that are connected to the target cell and occupied by the sub-level maps placed in the map region is greater than or equal to a predetermined quantity threshold; and
   combining the target cell and sub-level maps on the cells that are connected to the target cell and occupied by the sub-level maps placed in the map region to form a target level map.

6. The method according to claim 1, wherein the iteratively placing the to-be-placed sub-level maps at target candidate regions adjacent the at least one of the first M sub-level maps in accordance with a predetermined condition to obtain a target map comprises:
   stopping placing new sub-level maps of the N sub-level maps in the map region when an area of the sub-level maps placed in the map region exceeds a predetermined area threshold after an $i^{th}$ sub-level map of the N sub-level maps is placed in the map region, wherein M<i<N.

7. An electronic device, comprising:
   a memory, configured to store executable instructions; and
   a processor, configured to, when executing the executable instructions, perform a map generation method including:
   randomly placing first M sub-level maps of N sub-level maps in a predetermined map region, N>M, and the first M sub-level maps not overlapping with each other and at least one of the first M sub-level maps is not connected to the others of the first M sub-level maps;
   selecting, among the remaining N-M sub-level maps, one or more to-be-placed sub-level maps; and
   iteratively placing the to-be-placed sub-level maps at target candidate regions adjacent the at least one of the first M sub-level maps in accordance with a predetermined condition to obtain a target map, wherein the predetermined condition comprises: after a to-be-placed sub-level map is placed at one of the target candidate regions, the sub-level map is connected to the at least one of the first M sub-level maps.

8. The electronic device according to claim 7, wherein the iteratively placing the to-be-placed sub-level maps at target candidate regions adjacent the at least one of the first M sub-level maps in accordance with a predetermined condition to obtain a target map comprises:

determining, for a currently to-be-placed sub-level map, a target candidate region that meets the predetermined condition; and placing the currently to-be-placed sub-level map in the target candidate region.

9. The electronic device according to claim 8, wherein the determining, for a currently to-be-placed sub-level map, a target candidate region that meets the predetermined condition comprises:

determining that a target placement position corresponding to the currently to-be-placed sub-level map exists adjacent the at least one of the first M sub-level maps in the map region, wherein the target placement position is used for placing a central point of a first region in which the currently to-be-placed sub-level map are located and a distance between at least one side in the first region and one side in the regions occupied by existing sub-level maps placed in the map region is greater than 0 and less than a predetermined distance threshold; and determining that the target candidate region exists in the map region.

10. The electronic device according to claim 9, wherein when the currently to-be-placed sub-level maps is placed in the target candidate region of the map region, the method further comprises:

providing, in the map region, a target transition map on an idle region adjacent to the target candidate region, wherein the target transition map is used for connecting the currently to-be-placed sub-level map to the target candidate region.

11. The electronic device according to claim 7, wherein the method further comprises:

identifying a target cell occupied by a sub-level map, wherein a quantity of cells that are connected to the target cell and occupied by the sub-level maps placed in the map region is greater than or equal to a predetermined quantity threshold; and combining the target cell and sub-level maps on the cells that are connected to the target cell and occupied by the sub-level maps placed in the map region to form a target level map.

12. The electronic device according to claim 7, wherein the iteratively placing the to-be-placed sub-level maps at target candidate regions adjacent the at least one of the first M sub-level maps in accordance with a predetermined condition to obtain a target map comprises:

stopping placing new sub-level maps of the N sub-level maps in the map region when an area of the sub-level maps placed in the map region exceeds a predetermined area threshold after an $i^{th}$ sub-level map of the N sub-level maps is placed in the map region, wherein M<i<N.

13. A non-transitory computer storage medium, comprising executable instructions that, when executed by a processor of an electronic device, cause the electronic device to perform a map generation method including:

randomly placing first M sub-level maps of N sub-level maps in a predetermined map region, N>M, and the first M sub-level maps not overlapping with each other and at least one of the first M sub-level maps is not connected to the others of the first M sub-level maps;

selecting, among the remaining N-M sub-level maps, one or more to-be-placed sub-level maps; and iteratively placing the to-be-placed sub-level maps at target candidate regions adjacent the at least one of the first M sub-level maps in accordance with a predetermined condition to obtain a target map, wherein the predetermined condition comprises: after a to-be-placed sub-level map is placed at one of the target candidate regions, the sub-level map is connected to the at least one of the first M sub-level maps.

14. The non-transitory computer storage medium according to claim 13, wherein the iteratively placing the to-be-placed sub-level maps at target candidate regions adjacent the at least one of the first M sub-level maps in accordance with a predetermined condition to obtain a target map comprises:

determining, for a currently to-be-placed sub-level map, a target candidate region that meets the predetermined condition; and placing the currently to-be-placed sub-level map in the target candidate region.

15. The non-transitory computer storage medium according to claim 14, wherein the determining, for a currently to-be-placed sub-level map, a target candidate region that meets the predetermined condition comprises:

determining that a target placement position corresponding to the currently to-be-placed sub-level map exists adjacent the at least one of the first M sub-level maps in the map region, wherein the target placement position is used for placing a central point of a first region in which the currently to-be-placed sub-level map are located and a distance between at least one side in the first region and one side in the regions occupied by existing sub-level maps placed in the map region is greater than 0 and less than a predetermined distance threshold; and determining that the target candidate region exists in the map region.

16. The non-transitory computer storage medium according to claim 15, wherein when the currently to-be-placed sub-level maps is placed in the target candidate region of the map region, the method further comprises:

providing, in the map region, a target transition map on an idle region adjacent to the target candidate region, wherein the target transition map is used for connecting the currently to-be-placed sub-level map to the target candidate region.

17. The non-transitory computer storage medium according to claim 13, wherein the method further comprises:

identifying a target cell occupied by a sub-level map, wherein a quantity of cells that are connected to the target cell and occupied by the sub-level maps placed in the map region is greater than or equal to a predetermined quantity threshold; and combining the target cell and sub-level maps on the cells that are connected to the target cell and occupied by the sub-level maps placed in the map region to form a target level map.

18. The non-transitory computer storage medium according to claim 13, wherein the iteratively placing the to-be-placed sub-level maps at target candidate regions adjacent the at least one of the first M sub-level maps in accordance with a predetermined condition to obtain a target map comprises:

stopping placing new sub-level maps of the N sub-level maps in the map region when an area of the sub-level maps placed in the map region exceeds a predetermined area threshold after an $i^{th}$ sub-level map of the N sub-level maps is placed in the map region, wherein M<i<N.

* * * * *